(12) United States Patent
Terpay et al.

(10) Patent No.: US 6,644,590 B2
(45) Date of Patent: Nov. 11, 2003

(54) ACTIVE SYSTEM AND METHOD FOR VIBRATION AND NOISE REDUCTION

(75) Inventors: Gregory Weston Terpay, Whippany, NJ (US); George G. Zipfel, Summit, NJ (US); William Welsh, North Haven, CT (US)

(73) Assignee: General Dynamics Advanced Information Systems, Inc., Greensboro, NC (US)

( * ) Notice: Subject to any disclaimer, the term of this patent is extended or adjusted under 35 U.S.C. 154(b) by 0 days.

(21) Appl. No.: 09/952,412

(22) Filed: Sep. 14, 2001

(65) Prior Publication Data

US 2002/0128072 A1 Sep. 12, 2002

Related U.S. Application Data

(60) Provisional application No. 60/233,309, filed on Sep. 15, 2000.

(51) Int. Cl.[7] ............................................. B64C 27/51
(52) U.S. Cl. .................... 244/17.27; 244/1 N; 188/378; 248/550
(58) Field of Search .............................. 244/1 N, 17.27, 244/54; 181/207, 208, 209; 248/638, 550; 188/378; 267/136

(56) References Cited

U.S. PATENT DOCUMENTS

| | | | |
|---|---|---|---|
| 2,569,882 A | 10/1951 | Bothezat | |
| 3,100,610 A | 8/1963 | Armstrong | |
| 3,477,665 A | 11/1969 | LeGrand | |
| 3,497,164 A | 2/1970 | Horak | |
| 3,502,290 A | 3/1970 | LeGrand et al. | |
| 3,514,054 A | 5/1970 | Mard et al. | |

(List continued on next page.)

FOREIGN PATENT DOCUMENTS

| WO | WO 98/06089 | 2/1998 | |
|---|---|---|---|
| WO | WO 98/16916 | * 4/1998 | ......... G10K/11/178 |
| WO | WO 98/30813 | 7/1998 | |
| WO | WO 98/39580 | 9/1998 | |

OTHER PUBLICATIONS

Kottapalli et al., "Exploratory Study on Neural Control of Rotor Noise and Hub Loads", *American Helicopter Society Technical Specialists' Meeting for Rotorcraft Acoustics and Aerodynamics*, (Oct. 28–30, 1997), pp. 1–28.
"Active Control of Structural Response", *The Technology for Vibration Control*.
Lord Corporation, "Vibration, Shock, Motion and Noise Control", *Rotary Wing Aircraft Products*, pp. 1–11.
R.R. Leitch et al., "Active Noise Control Systems", *IEE Proceedings*, vol. 134, Pt. A, No. 6, Jun. 1987, pp. 525–546.

(List continued on next page.)

*Primary Examiner*—Michael J. Carone
*Assistant Examiner*—Gabriel S. Sukman
(74) *Attorney, Agent, or Firm*—Moore & Van Allen PLLC; Michael G. Johnston

(57) ABSTRACT

An active mount is provided for use in a rotary wing aircraft between each of the gearbox and airframe mounting locations for mechanically suspending the airframe from the gearbox. The active mount comprises first and second linear hydraulic actuators each having a principal axis. The length of the actuators is variable along the principal axis for providing relative movement between the airframe and the gearbox. The principal axes of the actuators are adapted to lie in the directional planes of the primary forces necessary for supporting the airframe and acting on the transmission gearbox mounting locations for providing movement of the gearbox relative to the airframe in the planes at a frequency for reducing the transfer of vibration through the active mount to the airframe. A system for reducing vibration in the rotary wing aircraft further comprises a hydraulic system for supplying a controlled flow of pressurized hydraulic fluid to the actuators.

31 Claims, 20 Drawing Sheets

U.S. PATENT DOCUMENTS

| | | |
|---|---|---|
| 3,563,499 A | 2/1971 | Dueweke |
| 3,606,233 A | 9/1971 | Scharton et al. |
| 3,690,607 A | 9/1972 | Mard |
| 3,836,098 A | 9/1974 | Miyashita |
| 3,908,399 A | 9/1975 | Durno et al. |
| 3,955,783 A | 5/1976 | Glaze et al. |
| 4,088,042 A | 5/1978 | Desjardins et al. |
| 4,089,494 A | 5/1978 | Anderson et al. |
| 4,111,386 A | 9/1978 | Kenigsberg et al. |
| 4,362,281 A | 12/1982 | Cresap et al. |
| 4,372,431 A | 2/1983 | Desjardins |
| 4,405,101 A | 9/1983 | Carlson et al. |
| 4,483,425 A | 11/1984 | Newman |
| 4,677,676 A | 6/1987 | Eriksson |
| 4,808,863 A | 2/1989 | Andersson |
| 4,819,182 A * | 4/1989 | King et al. ............. 244/17.11 |
| 4,848,525 A | 7/1989 | Jacot et al. |
| 4,947,356 A | 8/1990 | Elliott et al. |
| 5,005,678 A | 4/1991 | Julien et al. |
| 5,146,505 A | 9/1992 | Pfaff et al. |
| 5,174,552 A | 12/1992 | Hodgson et al. |
| 5,219,143 A | 6/1993 | Staple et al. |
| 5,228,640 A | 7/1993 | Mouille |
| 5,310,137 A * | 5/1994 | Yoerkie et al. ............. 188/379 |
| 5,316,240 A * | 5/1994 | Girard et al. ............... 188/380 |
| 5,327,061 A | 7/1994 | Gullapalli |
| 5,332,061 A | 7/1994 | Majeed et al. |
| 5,398,785 A | 3/1995 | Leitmann et al. |
| 5,418,858 A | 5/1995 | Shoureshi |
| 5,427,347 A | 6/1995 | Swanson et al. |
| 5,453,943 A | 9/1995 | Magliozzi |
| 5,505,282 A | 4/1996 | Olgac |
| 5,520,375 A | 5/1996 | Leibach et al. |
| 5,526,292 A | 6/1996 | Hodgson et al. |
| 5,551,650 A | 9/1996 | Southward et al. |
| 5,582,385 A | 12/1996 | Boyle et al. |
| 5,590,205 A | 12/1996 | Popovich |
| 5,595,372 A | 1/1997 | Patten |
| 5,600,955 A | 2/1997 | Sahinkaya |
| 5,603,387 A | 2/1997 | Beard et al. |
| 5,620,068 A | 4/1997 | Garnjost et al. |
| 5,687,948 A | 11/1997 | Whiteford et al. |
| 5,713,438 A | 2/1998 | Rossetti et al. |
| 5,832,095 A | 11/1998 | Daniels |
| 5,873,559 A | 2/1999 | von Flotow et al. |
| 5,876,012 A | 3/1999 | Haga et al. |
| 5,964,327 A | 10/1999 | Shih |
| 6,105,900 A * | 8/2000 | Welsh et al. ................. 244/1 N |
| 6,138,947 A * | 10/2000 | Welsh et al. ................. 244/1 N |
| 6,402,089 B1 * | 6/2002 | Kiss et al. ................... 181/207 |
| 6,416,016 B1 * | 7/2002 | Welsh ......................... 188/378 |
| 2001/0017341 A1 | 8/2001 | Gennesseaux |

OTHER PUBLICATIONS

Stephen J. Elliott, et al., "The Behavior of a Multiple Channel Active Control System", *IEEE Transactions on Signal Processing*, vol. 40, No. 5, May 1992, pp. 1041–1052.

*Active Sound & Vibration Control News*, vol. 4, No. 1, Jan. 1997, pp. 1–6.

L.J. Eriksson, "Active Sound and Vibration Control: A Technology in Transition", *Noise Control Eng.*, vol. 44, No. 1, Jan.–Feb. 1996, pp. 1–9.

L.J. Eriksson, "A Primer on Active Sound and Vibration Control", *Sensors*, Feb. 1997, pp. 18–31.

* cited by examiner

ACTIVE SYSTEM AND METHOD FOR VIBRATION AND NOISE REDUCTION

CROSS-REFERENCES

This application claims the benefit of U.S. Provisional Application No. 60/233,309, filed Sep. 15, 2000, the contents of which are hereby incorporated by reference.

The Government has rights to the invention pursuant to government contract N000014-96-C-2079 awarded by the United States Naval Research Laboratory.

BACKGROUND

The present invention relates generally to an active system and method for mounting a vibrating component to a support structure for reducing the transmission of vibration and noise passing from the vibrating component to the support structure and, more particularly, to an active vibration and noise reduction system and method for use on a rotary wing aircraft.

Significant effort has been devoted to reducing the vibratory and acoustic loads on aircraft, particularly rotary wing aircraft such as helicopters, and the resulting vibration and noise that develops within the aircraft. A primary source of vibratory and acoustic loads in a helicopter is the main rotor system.

The main rotor system of a helicopter includes rotor blades mounted on a vertical shaft that projects from a transmission, often referred to as a gearbox. The gearbox comprises a number of gears which reduce the rotational speed of the helicopter's engine to the much slower rotational speed of the main rotor blades. The gearbox has a plurality of mounting "feet" which are connected directly to structure in the airframe which supports the gearbox.

The main rotor lift and driving torque produce reaction forces and moments on the gearbox. All of the lift and maneuvering loads are passed from the main rotor blades to the airframe through the mechanical connection between the gearbox feet and the airframe. The airframe structure which supports the gearbox is designed to react to these primary flight loads and safely and efficiently transmit the flight loads to the airframe.

In addition to the nearly static primary flight loads, the aircraft is also subjected to vibratory loads originating from the main rotor blades and acoustic loads generated by clashing of the main rotor transmission gears. The vibratory loads are strongest at a frequency equal to the rotational speed of the main rotor blades (P), which is generally between about 4 and about 5 Hz, multiplied by the number of rotor blades, typically 2 or 4. The product of the main rotor blades rotational speed and the number of blades is called the "fundamental". Tonals of decreasing vibratory strength occur at multiples of two, three and sometimes four of the fundamental. For example, for a 4 bladed rotor, this would correspond to 8P, 12P, and 16P.

The acoustic loads generated by the transmission gears are at a frequency that the gear teeth mesh with and contact each other, and are thus related to the type of construction and gear ratios used in the transmission. The acoustic loads also include a fundamental and tonals of decreasing strength at integer multiples of the fundamental. Typically, the noise generated by gear clashing is in the range of about 500 Hz to about 3 kHz.

The vibratory and acoustic loads produce vibrations and audible noise that are communicated directly to the helicopter airframe via the mechanical connection between the gearbox and the airframe. This mechanical connection becomes the "entry point" for the unwanted vibration and noise energy into the helicopter cabin. The vibrations and noise within the aircraft cabin cause discomfort to the passengers and crew. In addition, low frequency rotor vibrations are a primary cause of maintenance problems in helicopters.

In the past, "passive" solutions have been tried for reducing the vibratory and acoustic loads on aircraft and the resulting vibration and noise that develops within the aircraft. For noise reduction, passive systems have employed broadband devices such as absorbing blankets or rubber mounts. However, broadband passive systems have generally proven to be heavy and, consequently, not structurally efficient for aircraft applications where weight is paramount. Additionally, broadband passive systems are not very effective at reducing low frequency vibration. A passive technique for reducing vibration involves the installation of narrowband, low frequency vibration absorbers around the aircraft that are tuned to the vibration frequency of interest, typically the fundamental. These narrowband, passive vibration reduction systems are effective, but the number of vibration tonals present in a helicopter may require a number of these systems which then adds significant weight. Additionally, narrowband passive systems work best when placed at ideal locations about the helicopter airframe, many of which may be occupied by other equipment.

More recently, "active" vibration and noise reduction solutions are being employed since active systems have a much lower weight penalty and can be effective against both low frequency vibration and higher frequency noise. Active systems utilize sensors to monitor the status of the aircraft, or the vibration producing component, and a computer-based controller to command countermeasures to reduce the vibration and noise. The sensors are located throughout the aircraft and provide signals to the adaptive controller. The controller provides signals to a plurality of actuators that are located at strategic places within the aircraft. The actuators produce controlled forces or displacements which attempt to minimize vibration and noise at the sensed locations.

Low frequency motion (i.e., vibration) behaves according to rigid body rules and structural models can be used to accurately predict the nature and magnitude of the motion. Since low frequency motion is easily modeled, its negative effects can be cancelled with an active system of moderate complexity. High frequency motion (i.e., noise) at the transmission gear clash frequencies does not obey the rigid body rules present at low vibration frequencies. The use of riveted airframes in combination with the complex mode shapes present at high frequencies make structural models much less accurate. As a result, active systems for high frequency energy reduction become more complex, requiring large numbers of actuators and sensors to counter the more complex modal behavior of the airframe structure.

Some active systems utilize hydraulic actuation systems and hydraulic actuators to reduce vibration and noise. The hydraulic actuation system is preferred since the hydraulic system provides the necessary control bandwidth and authority to accommodate the frequencies and high loads typically experienced in an aircraft such as a helicopter. Additionally, aircraft typically have hydraulic power sources with spare capacity which can be utilized or augmented.

Two methods of actuator placement are frequently used in active systems: (1) distribute the actuators over the airframe, or (2) co-locate the actuators at, or near, the vibration or noise entry point. The co-location approach places the actuators at or near the structural interface between the transmission and airframe, stopping vibration and noise near the entry point before it is able to spread out into the aircraft. This has the advantage of reducing the number of actuators and the complexity of the control system. Active systems using this approach employ actuators mounted in parallel or in series with the entry point to counteract the vibration and noise.

The distributed actuator approach requires a large number of actuators for controlling noise due to the high frequencies, and their associated short spatial wavelength. The large number of actuators can drive up weight and add significantly to control system complexity. One distributed actuator active noise reduction system for use in a helicopter application uses more than 20 actuators to control transmission noise. Distributed actuators for low frequency vibration will be less numerous and are effective at reducing vibration at the sensor locations, but can drive vibration at other areas of the aircraft to levels exceeding those already present.

The parallel actuator approach is effective for low frequency vibration but can produce counteracting forces in the supporting structural elements which can exceed the design limit of the elements and lead to premature failure. Additionally, the parallel approach is not effective at reducing noise because the parallel actuator provide a direct path for noise entry.

The series approach is the most effective in reducing cabin vibration and avoids the introduction of unwanted vibrations. This approach would use actuators mounted in series between the transmission gearbox feet and airframe support structure. In this approach, the gearbox and airframe are isolated from each other connected only by actuators. The gearbox would vibrate in its own inertial frame separately from the airframe's inertial frame, isolating the gearbox and airframe in a dynamic sense. This approach interrupts the transmission of vibratory and acoustic energy through the principal entry point thereby preventing vibration and noise from entering the airframe. For this approach to be effective, the vibration and noise isolation system must support the large, static primary flight loads along an axis also requiring dynamic isolation. This system must maintain the average static position of the transmission relative to the airframe for proper operation of the other helicopter systems, particularly the helicopter engines that couple into the transmission. However, in the series approach, the high frequencies associated with noise lead to complex motions at the entry point which, if fully addressed, may lead to large and heavy actuators to actively control all degrees of freedom at each entry point.

For the foregoing reasons, there is a need for a new system for reducing both vibration and noise in aircraft applications, and particularly helicopters. Preferably, the new vibration reduction system will rely on an active solution for isolating a vibratory load source, such as the main rotor system of the helicopter, and preventing the low frequency vibration generated by the main rotor system from being transmitted to the airframe. The system should efficiently pass the primary flight loads while maintaining the average static position of the transmission relative to the airframe. The system should utilize a hydraulic actuation system and actuators, taking advantage of the hydraulic power capacity on the aircraft.

The new system should also include a device and method for reducing noise. In a helicopter application, this new device should address the high frequency noise generated in a helicopter by the clashing of the transmission gear teeth. Ideally, the new device should function in cooperation with the other elements of the system. The new device should also take advantage of the isolation properties of the vibration reduction system to effectively reduce transmission noise without significantly increasing weight and minimizing the complexity of the overall vibration and noise reduction system.

SUMMARY

It is an object of the present invention to provide a system for simultaneously reducing both vibration and noise in aircraft applications, and particularly helicopters.

Another object of the present invention is to provide an active device and system for isolating the main rotor system of a helicopter from the airframe for preventing the low frequency vibration generated by the main rotor system from being transmitted to the airframe.

A further object of the present invention is to provide an active vibration reduction system for passing the primary flight loads of the helicopter from the main rotor system to the airframe while maintaining the average static position of the transmission relative to the airframe.

According to the present invention, an active mount is provided for use in a rotary wing aircraft, the active mount comprising first and second linear hydraulic actuators each having a principal axis and adapted to be disposed between each of the gearbox and airframe mounting locations for mechanically suspending the airframe from the gearbox. The length of the actuators is variable along the principal axis for providing relative movement between the airframe and the gearbox. The principal axes of the actuators are adapted to lie in the directional planes of the primary forces necessary for supporting the airframe and acting on the transmission gearbox mounting locations for providing movement of the gearbox relative to the airframe in the planes at a frequency for reducing the transfer of vibration through the active mount to the airframe. In one embodiment, the active mount comprises first and second rigid members and the actuators comprise a piston slidably disposed in a cylinder for linear reciprocal movement along the principal axis. The first rigid member is connected to the airframe and the second rigid member is connected to the gearbox. One end of each hydraulic actuator is attached to the first rigid member and a piston rod extending from the other end of the actuator is connected to the second rigid member.

Further in accordance with the present invention, a system is provided for reducing vibration in a rotary wing aircraft, including the active mount, and further comprising hydraulic actuation means for supplying pressurized hydraulic fluid to the actuators. The hydraulic actuation means includes a source of pressurized hydraulic fluid and an electro-hydraulic valve hydraulically connected between the source and the hydraulic actuators. Means for sensing parameters related to vibration from the airframe produce a signal output representative of the sensed parameter. Means operatively connected to the valve and the sensing means receive the signals produced by the sensing means and generate output control signals to the valve responsive to the sensing means signals. The sensor signal receiving and control signal generating means may comprise a computer for applying a programmed control algorithm to the sensor signals for generating the valve control signals. The output control signals operate the valve for selectively supplying a flow of pressurized hydraulic fluid from the source to the actuators. The length of the actuators are thus varied in the planes of the primary supporting forces thereby moving the gearbox in the planes relative to the airframe at a frequency for reducing the transfer of vibration through the active mount to the airframe.

Still further in accordance with the present invention, a method is provided for reducing vibration in a rotary wing aircraft, the method comprising the steps of disposing the active mount between each point of contact of the gearbox and airframe for mechanically suspending the airframe from the gearbox, sensing parameters related to vibration or noise from the airframe and producing a signal output representative of the sensed parameter. The method of the present invention further includes the steps of processing the signals produced by the sensor, generating an output control signal to the valve responsive to the sensed signal for operating the valve to selectively supply a flow of pressurized hydraulic fluid from the source to the actuators, and moving the gearbox relative to the airframe in the planes of the primary supporting forces acting on the transmission gearbox mounting locations by varying the length of the actuators at a frequency for reducing the transfer of vibration through the active mount to the airframe.

Also in accordance with the invention, a rotary wing aircraft is provided including the active vibration reduction system and method.

The present invention features two hydraulic actuators at each mounting location of the transmission gearbox to the airframe. The principal axis of the first and second actuators may be substantially vertical and substantially horizontal, respectively. Alternatively, the principal axis of the second actuator may also form an acute angle with the longitudinal axis of the airframe. Similarly, the principal axis of the first actuator may form an acute angle with the vertical longitudinal and vertical lateral planes of the airframe, or the principal axis of the second actuator may form an acute angle with the vertical longitudinal and horizontal longitudinal planes of the airframe. The object is to provide actuators whose principal active axes lie in the directional planes of the primary forces necessary for supporting the airframe and acting on the transmission gearbox mounting locations for providing movement of the gearbox relative to the airframe in the planes.

In a helicopter, the active mounts may comprise four active mounts with two such mounts being forward active mounts located forward of the rotor and on opposite lateral sides thereof and the two remaining mounts being after active mounts located aft of the rotor axis of rotation and on opposite lateral sides thereof. In one embodiment, a first valve controls the delivery of fluid to the first forward active mounts and a second valve controls the delivery of fluid to the second forward active mounts.

Another feature of the present invention is the hydraulic actuation means which provides a quasi-steady pressure to each actuator to support the applied quasi-steady flight and maneuvering loads and for maintaining the transmission gearbox in a steady, static position relative to the airframe at maneuvering frequencies.

The active vibration reduction system and method adopts the series approach for active mount placement with the actuators mounted in series between the transmission gearbox feet and airframe support structure for reducing vibration on board a rotary wing aircraft. The gearbox and airframe are isolated, thereby interrupting the transmission of vibratory and acoustic energy through the active mount to the airframe. The active mount of the present invention supports the static primary flight loads while maintaining the average static position of the transmission relative to the airframe. Moreover, the system requires only two actuators per mount which significantly reduces the complexity and weight of the system. A passive noise isolator incorporated into the system serves to reduce high frequency noise generated by the transmission gear teeth.

The foregoing and other features and advantages of the present invention will become more apparent in light of the following detailed description of the preferred embodiments thereof, as illustrated in the accompanying figures. As will be realized, the invention is capable of modifications in various respects, all without departing from the invention. Accordingly, the drawings and the description are to be regarded as illustrative in nature, and not as restrictive.

DRAWINGS

For the purpose of illustrating the invention, the drawings show a form of the invention which is presently preferred. However, it should be understood that this invention is not limited to the precise arrangements and instrumentalities shown in the drawings.

DESCRIPTION

While the invention will be described in connection with one or more preferred embodiments, it will be understood that it is not intended to limit the invention to those embodiments. On the contrary, it is intended that the invention cover all alternatives, modifications and equivalents as may be included within the spirit and scope of the invention as defined by the appended claims.

Certain terminology is used herein for convenience only and is not to be taken as a limitation on the invention. For example, words such as "upper," "lower," "left," "right," "horizontal," "vertical," "upward," and "downward" merely describe the configuration shown in the Figures. Indeed, the components may be oriented in any direction and the terminology, therefore, should be understood as encompassing such variations unless specified otherwise.

Figure 1:
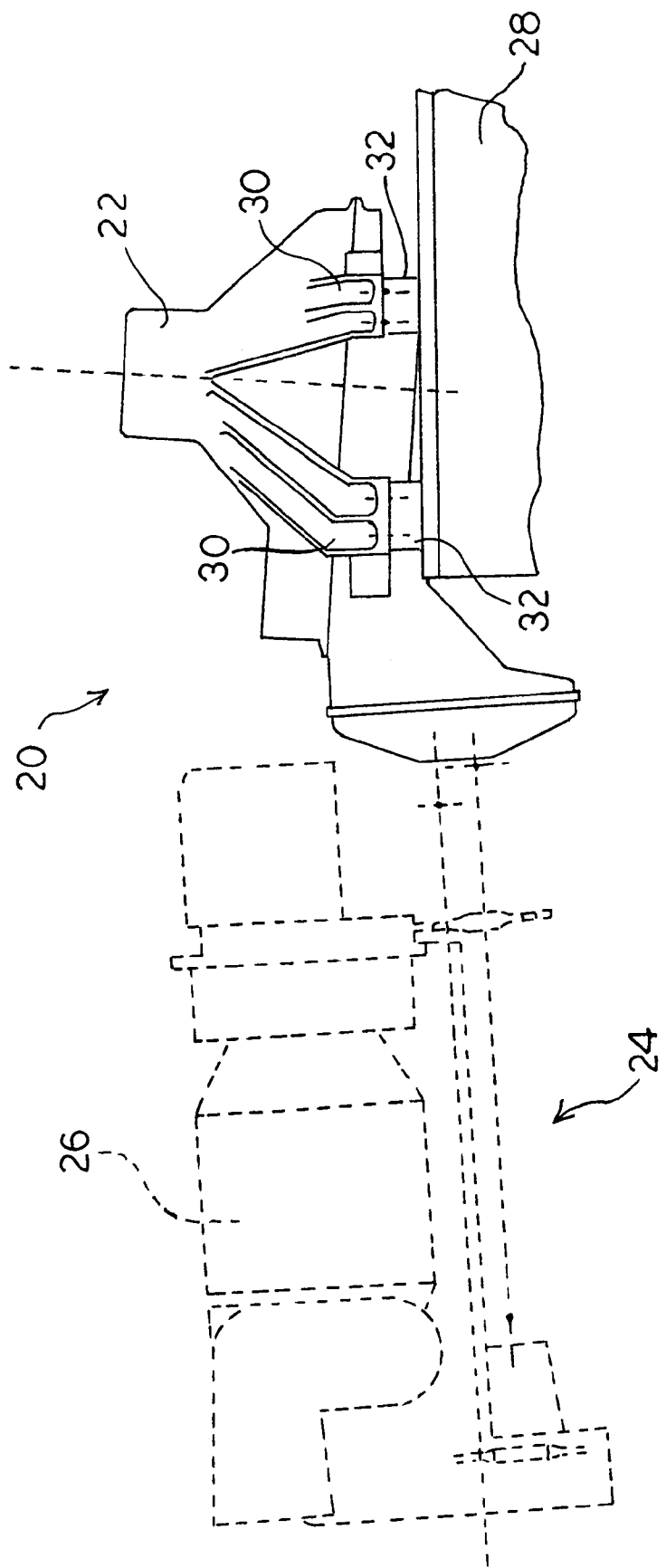
FIG. 1 is a schematic representation of a helicopter transmission arrangement incorporating the present invention.

Referring now to the drawings, wherein like reference numerals illustrate corresponding or similar elements throughout the several views, FIG. 1 illustrates a transmission arrangement 20 for a helicopter. The transmission arrangement 20 includes a gearbox 22 which is connected to a helicopter rotor head (not shown). The gearbox 22 is also connected to the drive train 24 of the helicopter's engine 26. The gearbox 22 is supported by an airframe comprising a structural element 28. The gearbox 22 includes a plurality of mounting feet 30 which are attached to the airframe structure 28. In accordance with the present invention, active transmission mounts (ATMs) 32 are mounted in series between the each gearbox mounting foot 30 and the airframe structure 28 for isolating the mounting feet 30 of the main rotor gearbox 22 from the airframe.

Figure 2:
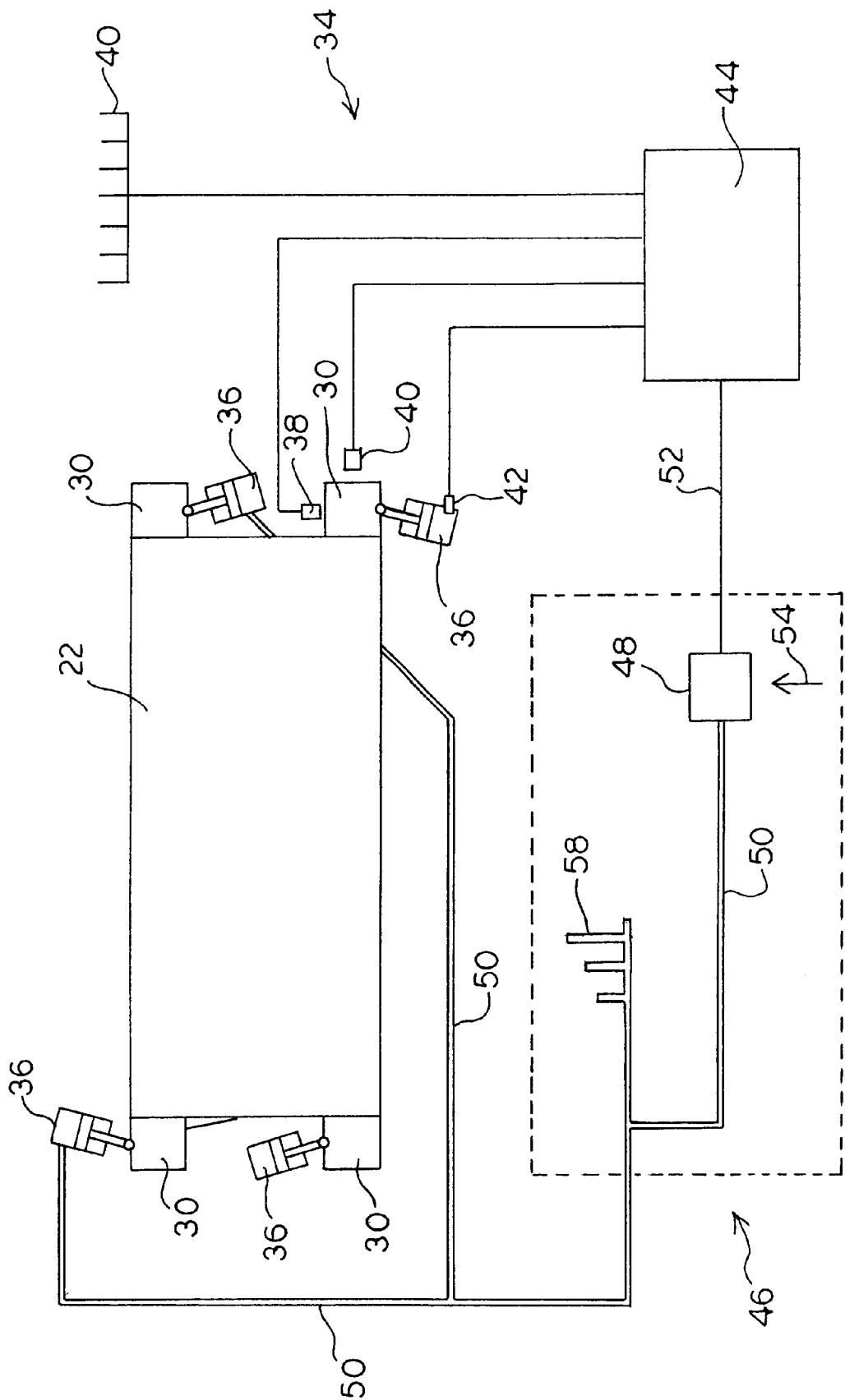
FIG. 2 is a schematic representation of an embodiment of a system according to the present invention for reducing vibration and noise passing from a helicopter transmission gearbox to the airframe.

According to the present invention, the ATM 32 is a part of an active transmission mount system 34, an embodiment of which is schematically illustrated in FIG. 2. The ATM system 34 comprises one or more hydraulic ATM actuators 36 associated with each of four ATMs 32, a plurality of sensors 38, 40, 42 positioned throughout the aircraft, an electronic controller 44 which sends signals to a hydraulic actuation system 46 for commanding the actuation system to actuate the ATM actuators 36 according to the desired operational state.

The sensors comprise position sensors 38 for monitoring the static position of the feet 30 relative to the airframe 28. These sensors 38 are used along with the controller 44 and the actuation system 46 to ensure that the transmission does not move out of static alignment with other elements of the airframe. The preferred location and type of the other sensors 40, 42 are a function of the type of control approach used by the controller 44. For example, one type of control approach utilizes sensors 40 that are located adjacent to the mounting feet 30 and the ATM's 32. These sensors 40 comprise accelerometers, to sense airframe acceleration. This same control approach may use pressure sensors 42 to sense dynamic pressure fluctuations in the actuator fluid lines 50. An alternate control approach may use accelerometers 40 mounted at selected locations within the airframe, such as at the foot of the pilot or a seat. The choice of local sensors (accelerometers 40 or pressure sensors 42) or remote accelerometers 40 is largely based on the type of airframe to which the ATM system 34 is applied and is also based on the stiffness requirements defined for the ATM actuators 36.

The signals output from the sensors 38, 40, 42 are provided for processing to the controller 44 which comprises a signal processor, computer, or the like. For each mounting foot 30, the controller 44 determines the position of the foot 30 and vibratory loading of the airframe based on the sensed signals being transmitted by the sensors. The controller 44 then determines a desired operational state for each ATM actuator 36 as a function of one or more of the sensed signals and operates to nullify position offset of the gearbox 22 while also reducing the vibratory load passing through the ATMs 32 and into the airframe.

The hydraulic actuation system 46 supplies a hydraulic fluid under pressure to each hydraulic actuator 36 so that the actuator moves in the desired manner and at the desired frequency to reduce the sensed vibrations emanating from a mounting foot 30 of the gearbox 22 passing into the airframe. In the illustrated embodiment, the hydraulic actuation system 46 includes one or more electro-hydraulic valves 48 which are each electrically connected to the controller 46 via a control line 52 for supplying current to the valve 54. For example, the hydraulic inputs of the two actuators 36 shown in FIG. 2 are interconnected into a common hydraulic fluid line 50 and connected to the hydraulic control valve 48. For the sake of simplicity, only a single hydraulic control valve 48 and associated hydraulic interconnections are shown. The controller 44 generates output control signals to the hydraulic control valve(s) 48 in response to the signals received from the sensors 38, 40, 42. The valve(s) 48 open and close in response to the output control signals to provide a vibratory flow of high pressure hydraulic fluid from a fluid source (not shown) to and from the actuators 36. In FIG. 2, the supply flow into the valve 48 is generally indicated at 54 and the flow to the ATM actuators 36 is generally indicated at 50. The hydraulic pressure and location of the actuators' pistons are thus adjusted by the controller 44 based on the signal from the sensors 38, 40, 42.

The active transmission mount system 34 of the present invention acts to isolate the vibratory and acoustic loads generated by the main rotor gearbox 22 from the airframe. The ATM system 34 achieves vibration reduction by controlling the applied fluid flow within the ATM actuators 36, and thus the hydraulic pressure acting on the pistons in the actuators 36. A quasi-steady pressure is applied to each actuator 36 to react to the applied quasi-steady flight and maneuvering loads. The vibratory loads that are applied along the actuator's principle, or "active", axis are transmitted into the hydraulic column. This causes cancellation of pressure fluctuations which would otherwise be transmitted into the airframe causing vibration if left unaltered. Generally, an increase in hydraulic pressure on the pistons when a vibratory load pushes on the actuator 36 is relieved by the ATM system 34 by removing fluid, and a decrease in hydraulic pressure when a vibratory load pulls on the actuator 36 is accommodated by the ATM system 34 by increasing hydraulic fluid flow to the actuator. Hence, the actuator 36 is operated by removing and supplying a sufficient amount of hydraulic fluid against the head of the piston to allow the piston to translate in substantially the same direction and at substantially the same frequency as the vibrating gearbox 22. In this way, the ATM system 34 allows relative motion between the gearbox 22 and the airframe at low vibration frequencies, typically greater than about 2 Hz, so that the gearbox 22, in effect, floats in a dynamic sense with respect to the airframe, but maintains a steady, static position relative to the airframe. As a result, vibratory pressure is minimized, thereby reducing the transfer of vibration related to the applied rotor vibratory loads from the ATM 32 to the airframe.

Also, as seen in FIG. 2, the actuation system 46 preferably includes a passive noise isolator 58. The passive isolator 58 introduces softness into the hydraulic system at predetermined frequencies to allow the system to attenuate high frequency (e.g., >500 Hz) and low amplitude, 1/1000 inch, noise that is otherwise transmitted by the gearbox feet 30 to the ATM 32 causing high frequency noise in the fluid lines 50 which, in turn, leads to noise in the aircraft. In order to reduce this high frequency noise, the hydraulic line 50 is connected to the passive isolator 58. It is understood that the other hydraulic lines (not shown) that interconnect the valves 48 and their associated actuators 36 are also connected to passive isolators.

According to the present invention, a system analysis is performed to determine the ATM actuator 36 placement, orientation and size (piston diameter). The actuator 36 placement, orientation and size is determined principally by the static loads between the transmission 22 and the airframe needed to keep the relative position of the transmission and the airframe constant at maneuvering frequencies, which are effectively static. The actuators 36 must supply these loads under all operating conditions. In addition, the actuators must respond to aircraft dynamic loads. Preferably, the actuators 36 should be no larger than necessary, as large actuators result in added weight and power consumption. The actuator configuration selected should use a minimum number of actuators to minimize system cost and maximize system reliability. And, to simplify actuator design, the actuators selected should use only single acting hydraulic pistons.

The system analysis of the present invention is an iterative process involving the following steps: (1) development of a mathematical model of the relative movement of the transmission and the airframe at the transmission mounting locations based on finite element models (FEM) of the transmission and airframe, (2) application of a sequence of flight scenarios, or cases, that define the motion of the transmission at a variety of load and speed conditions, (3) analysis of the motion of the transmission feet for each of the flight cases, (4) determination of an actuator placement and orientation scheme which satisfies all of the flight scenarios, and (5) iteration of step (4) until actuator sizing and orientation lead to satisfactory performance of the actuators under the loads described by steps (1)–(3), and taking into account any actuator physical mounting constraints for the particular application.

An example of the application of this analysis was performed on Sikorsky Aircraft Corporation's S-76® aircraft (S-76® is a registered trademark of the Sikorsky Aircraft Corporation). Sikorsky Aircraft Corporation has developed a 60,000 degree of freedom FEM of the transmission and an 11,000 degree of freedom FEM of the airframe for the S-76®. Using the FEM and well-known mathematical operations, a model was constructed which defines the motion of specific grid points in the FEM. This is a standard use of FEM modal outputs to construct a simplified mathematical model of the structure of interest. For example, for the ATM vibration response, only low frequency modes, those with modal frequencies below 200 Hz, need be used to construct a response function describing the structure of interest. This mathematical response function can then be used to determine the resulting frequency response of the structure to a driving force over the frequency range of interest.

For the ATM system, the grid points of interest are the locations where the transmission gearbox 22 mounts to the airframe. Forces at the grid points representing the main rotor hub intersection with the transmission are provided by a simulation of helicopter response. Sikorsky Aircraft Corporation developed a simulation of the S-76® aircraft's performance called GENHEL. The GENHEL simulation allows the user to determine static loads at the rotor hub based on specific aircraft loads and aircraft speeds. This simulation was used to produce static hub loads at aircraft loads of 8,750 lbs, 11,700 lbs and 12,800 lbs. For each load case, aircraft speeds were selected at 20 mph increments beginning at near zero (hover) up to 160 mph, for a total of 9 cases per load. In addition, the 8,750 lb and 11,700 lb load cases were also run at 180 mph for a total of 29 combinations of weight and speed. These 29 cases were the flight scenarios used to design the ATM system for the S-76® aircraft.

To analyze the motions occurring at the transmission mounting locations the mathematical models of the transmission gearbox mounting foot 30 motion and the airframe motion are linked together at the foot locations using the mathematical equivalent of "soft" springs. Using the "soft" springs allows all of the motion between the foot and the airframe to be accounted for by motion in the springs. The springs are used to calculate the supporting forces the actuator 36 would have to supply. The following sequence of equations shows the structure of the combined transmission and airframe mathematical model.

$$[x_1]_n = \sum_{m=1}^{12} [A_1]_{n,m}[F_1]_m$$

$$[x_2]_n = \sum_{m=1}^{12} [A_2]_{n,m}[F_1]_m + \sum_{m=1}^{6} [A_3]_{n,m}[F_3]_m$$

$$[F_1]_n = \sum_{m=1}^{12} [B]_{n,m}[x_1 - x_2]_m$$

where m=1, . . . , 12, $A_1$ is the 12×12 airframe compliance at the 4 mounting transmission feet mounting locations, excluding torques, $A_2$ is the 12×12 airframe compliance matrix at the bottoms of the 4 transmission feet, $A_3$ is the 12×6 transfer compliance matrix between the 3 forces and 3 torques at the rotor hub and the 12 linear forces at the 4 transmission feet, B is a 12×12 diagonal stiffness matrix for 12 fictitious springs between the 4 transmission feet and the 4 airframe pads, $[X_1]_n$, where n=1, . . . , 12, is the airframe displacement at each of the four mounting locations in each of 3 orthogonal directions, $[X_2]_n$, where n=1, . . . , 12, is the airframe displacement at each of the four mounting locations in each of 3 orthogonal directions, $[F_3]$, where m=1, . . . , 6, is a 6 degree-of-freedom force vector applied to the transmission at the intersection of the main rotor hub and transmission, $[x_1-x_2]_m$, where m=1, . . , 12, is the spring displacement at each of four mounting locations in each of 3 orthogonal directions, and $[F_1]_m$, where m=1 , . . . , 12, is the resultant force applied to the base of the transmission at the airframe mounting pads from the force vector $[F_3]$.

The motion at the transmission mounting location is represented by the differential motion between the airframe motion at the mounting location, $x_1$, and the motion at the base of the transmission, $x_2$. The differential motion, $x_1-x_2$, when applied to the spring stiffness of the "soft" springs produces a disturbance force, $F_1$, which is applied at both the airframe and the transmission. The model is driven by hub forces from each of the 29 flight scenarios described above indicated by $F_3$. The elements in the compliance matrices, $A_1$, $A_2$ and $A_3$ are constructed from the simplified mathematical models of the transmission and airframe described above.

The next step in the system analysis is determination of the force vectors, $F_1$, resulting from each of the 29 flight scenarios described above. For each flight scenario, the GENHEL simulation provides a force vector, $F_3$, of hub forces. The forces between the airframe and the transmission are assumed to be completely described by a three-dimensional force vector. Since the S-76® transmission has four feet, there are a total of twelve components of force for the S-76® aircraft model. Further, since the transmission is a rigid body at these frequencies and is limited to six degrees of freedom, only six linearly independent combinations can be formed of these twelve components. A symmetric, 12×12 covariance matrix is constructed by forming the outer product of the forces $F_1$, resulting from each of the 29 flight cases. Each element in the covariance matrix is then summed over the set of 29 cases:

$$C_{nm} = \sum_{\mu=1}^{29} F_n^\alpha F_m^\alpha$$

where
  alpha is the aircraft flight test case from 1 to 29, and
  $F_n$ and $F_m$ are forces in the x, y, and z directions at each of the four mounting feet, so n and m range from 1 to 12.

Figure 3:
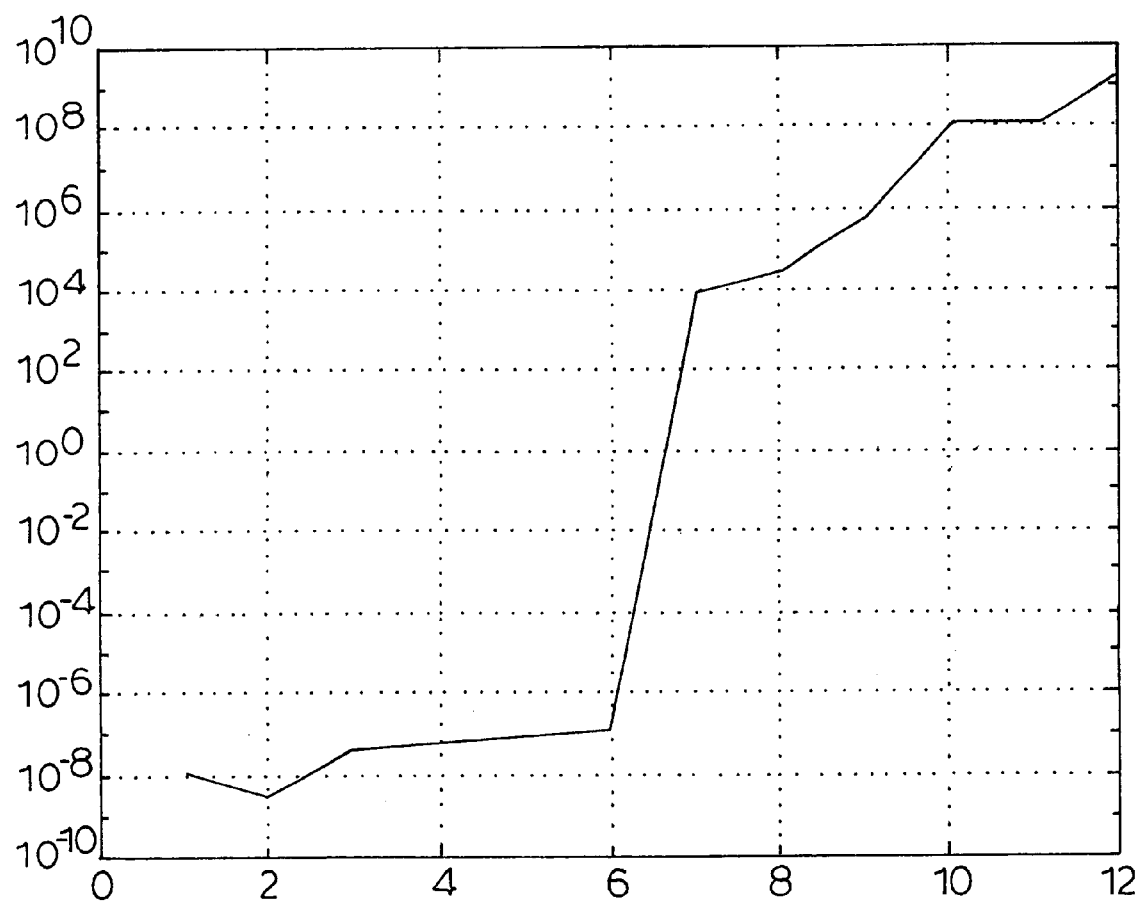
FIG. 3 is graph showing eigenvalues for static forces on a helicopter transmission gearbox foot.
Figure 4:
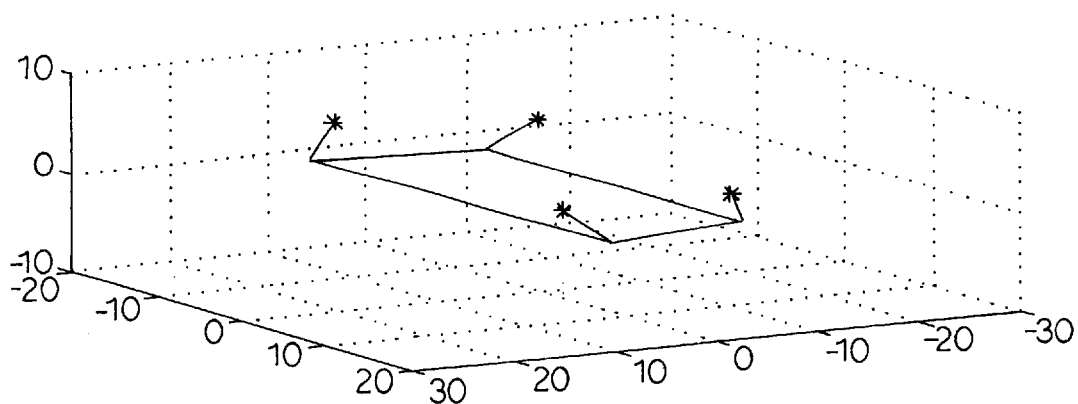
FIGS. 4–6 are graphs showing the eigenforces for eigenvalue 12 shown in FIG. 3.
Figure 5:
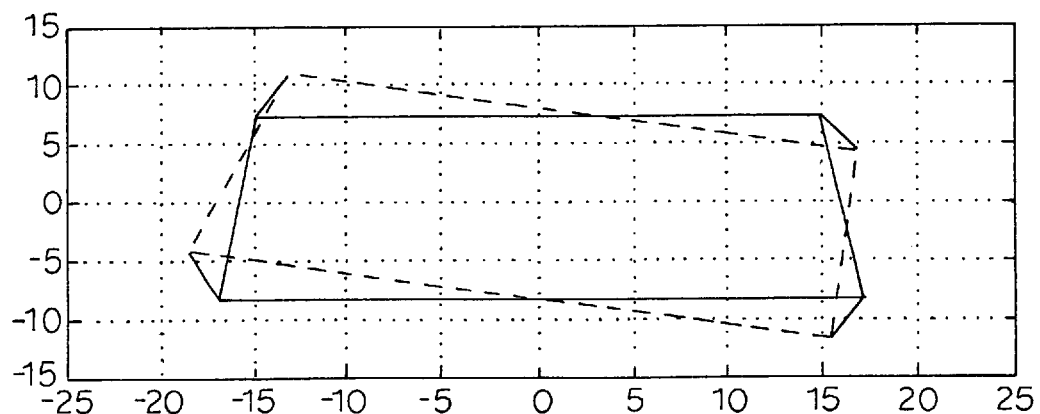
Figure 6:
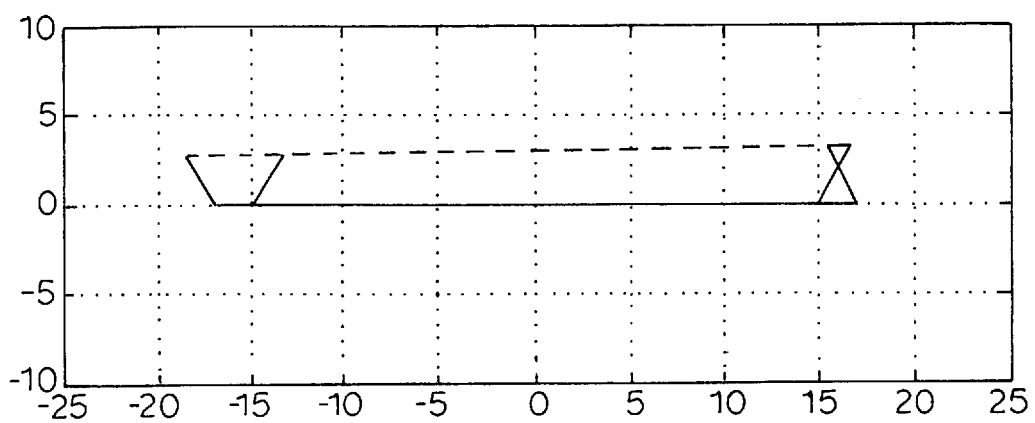

Because the transmission is limited to six degrees of freedom, the covariance matrix has six nonzero eigenvalues and six zero eigenvalues. An eigenvalue is the mean square force required for a support mode. FIG. 3 shows the values of each of the 12 eigenvalues for the S-76® aircraft application ordered from smallest to largest. The eigenvalues and eigenvectors resulting from the diagonalization of the force covariance matrix described above are determined using standard matrix solution software. The largest eigenvalue, number 12, has a magnitude approximately 30 times that of eigenvalues 10 and 11. Eigenvalues 10 and 11 are approximately 100 times larger than eigenvalue 9 and so on. Eigenvalues 1–6 are essentially zero. The ATM solution for the S-76® was thus focused on the three largest eigenvalues, eigenvalues 10–12, since the remaining eigenvalues have a significantly smaller impact on system response. Eigenvectors corresponding to each of the eigenvalues are the forces needed for the transmission to support the airframe. Examination of the forces corresponding to each eigenvector reveals its physical origin. For example, the eigenvector corresponding to eigenvalue number 12 (FIGS. 4–6) is a combination of vertical lift and rotor torque. Eigenvectors 10 and 11 associated with eigenvalues 10 and 11 represent the transverse torque needed to compensate for the center of mass not being directly on the rotor shaft axis and the forces and torque generated by aircraft forward motion and resulting air drag, respectively. It is understood that the values of the magnitude and orientation of the eigenvectors in this example are specific to the S-76® aircraft. However, the analytical process can be applied to other rotary wing aircraft.

Figure 7:
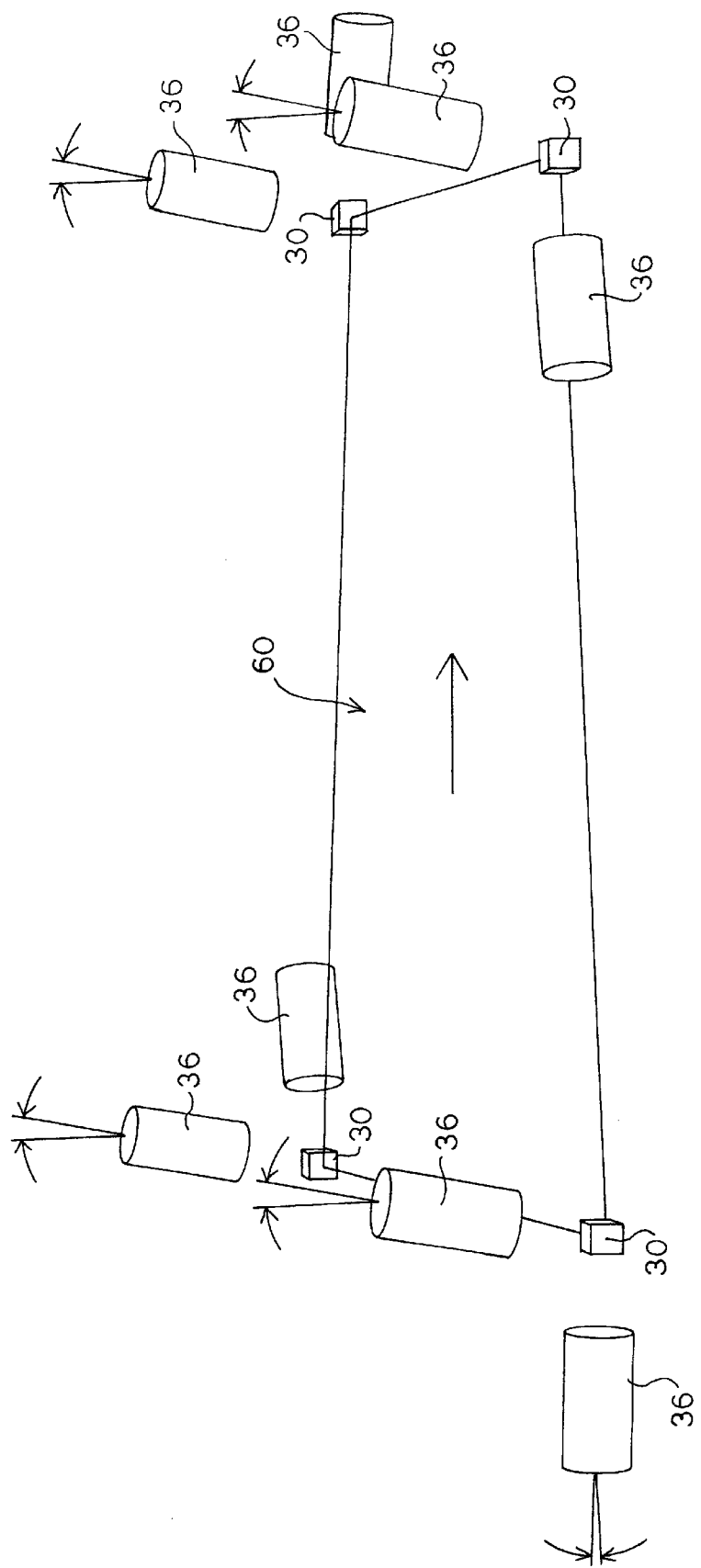
FIGS. 7–9 are schematic representations of the orientation directions for actuators in an active helicopter transmission mount according to the present invention.
Figure 8:
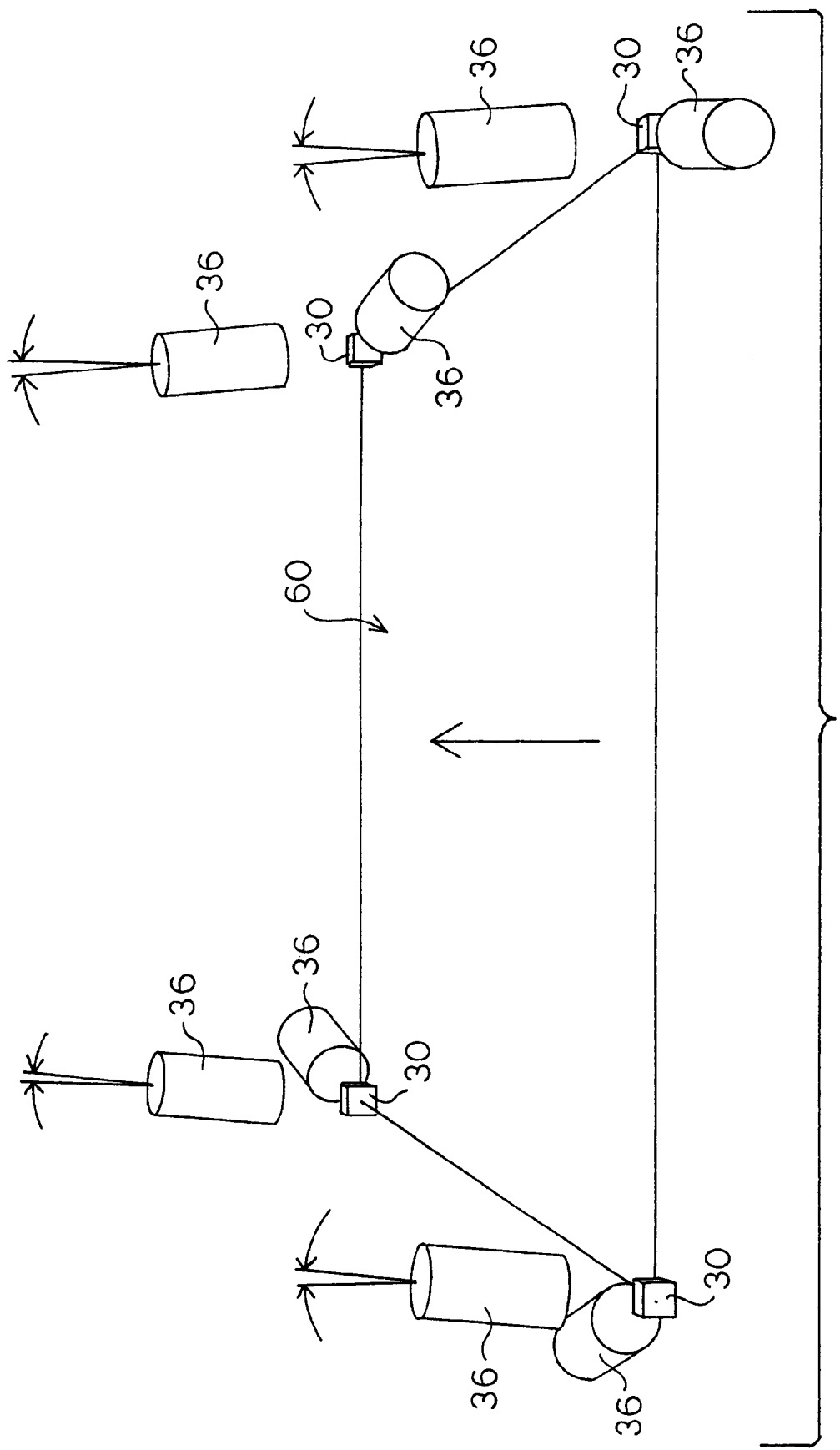
Figure 9:
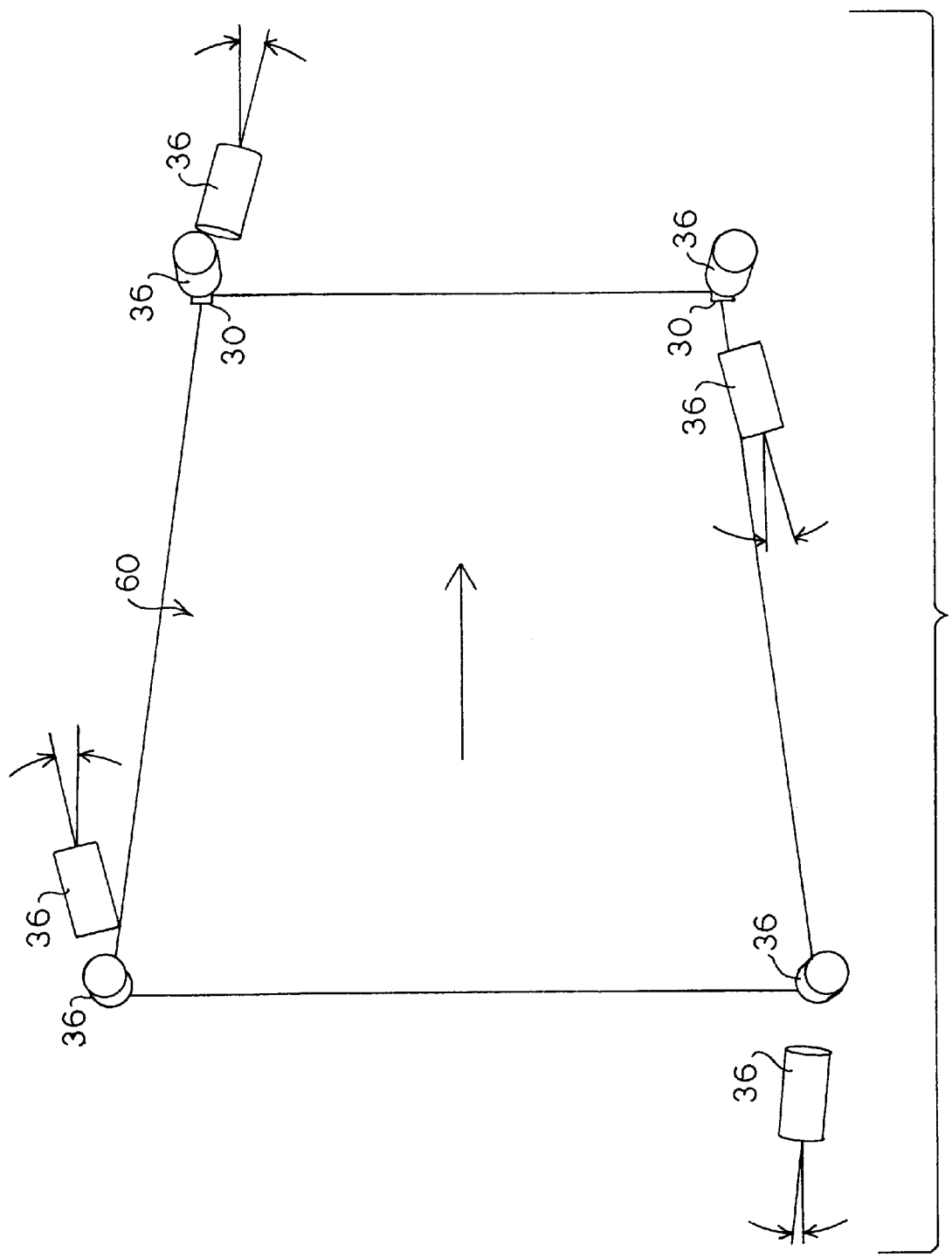

Once the operating conditions are determined in steps (1)–(3) above, the actuator placement and orientation scheme is chosen. The actuator configuration should satisfy the eigenvector forces and orientation for the eigenvectors associated with eigenvalues 10–12. A system design for the S-76® is shown schematically in FIGS. 7–9. Each of the four corners of the transmission mounting footprint 60 represents a gearbox mounting foot 30. The system utilizes a set of two, single acting actuators 36 per mounting foot 30 located in the predominantly vertical and predominantly horizontal directions. The vertical actuators 36 support the vertical lift load and pitching moment and the horizontal actuators 36 support the load resulting from torsion around the rotor shaft. As shown in FIGS. 7–9, actuator 36 mounting orientations off-vertical and off-horizontal were used to cover all of the eigenvectors of interest to support the smaller secondary static loads in the other three degrees of freedom. The vertical actuators 36 were angled forwardly and inwardly so that the principal axis of the actuators 36 formed an angle of about 10° and 5°, respectively, with the vertical axis. The right, aft horizontal actuator 36 was downwardly and outwardly angled so that the principal axis of the actuator 36 formed an angle of about 3.7° and 5°, respectively, with the central horizontal axis. The principal axes of the other horizontal actuators 36 are angled at about 15° relative to the central horizontal axis of the aircraft (FIG. 9), the left aft and right forward actuators inwardly and the left forward actuator 36 outwardly.

An iteration of Step (4) is performed until actuator size and orientation satisfy the loads under all operating conditions and subject to any physical mounting constraints for the particular application. The end result of the process defined above was an ATM actuator mounting scheme which defined the placement of two actuators at each transmission foot, the force requirements for the actuators and the detailed actuator mounting orientations. Dynamic hub loads for the S-76® design were measured using sensors installed on the S-76® rotor hub. These sensors measured the dynamic loads experienced by the transmission during flight. The magnitude of the measured dynamic loads was less than 10 percent of the largest static loads. The dominance of the static loads justifies the use of the static analysis as the principal design methodology. The magnitude of the dynamic loads was added to magnitude of the static loads described above to provide the overall actuator sizing. The resulting selection was tested by calculating the actuator forces required for each of the 29 flight cases. Small adjustments to actuator orientation and size were made until all 29 flight cases could be individually supported by the actuator system.

While the results of the system analysis according to the present invention has been presented with respect to the S-76® helicopter, it is understood that the system analysis is applicable to other helicopters and environments. Each make and model of helicopter to which this active vibration and noise reduction system of the present invention is applied will have a different set of actuator placement, orientation and size requirements due to that helicopter's unique design and flight envelope. The analysis, along with the engineering constraints considered for each make and model, will yield the appropriate actuator placement, orientation and size.

Figure 10:
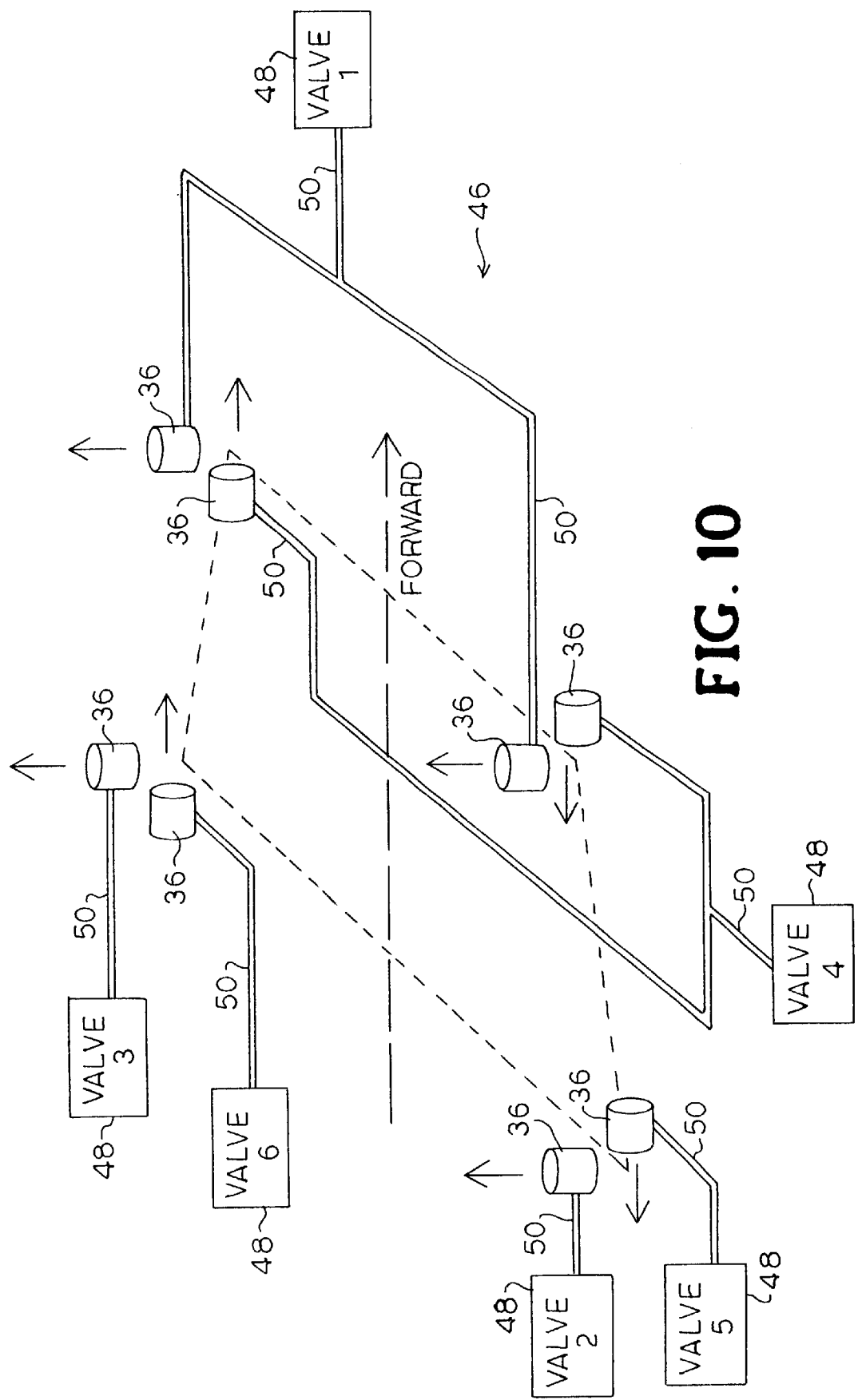
FIG. 10 is a schematic representation of a hydraulic actuation system according to the present invention for delivering fluid to a plurality of actuators.

A preferred arrangement of a portion of the ATM system 34 is schematically shown in more detail in FIG. 10. Each of the mounting feet 30 has an ATM 32 containing two ATM actuators 36 for canceling low frequency vibrations and for controlling the position of the foot 30 relative to the airframe. Six valves 48 are provided for controlling the eight ATM actuators 36. The position of the two forward vertical ATM actuators 36 is preferably controlled together from a single hydraulic control valve 48, Valve 1. The two aft vertical ATM actuators 36 are individually controlled by dedicated hydraulic control valves 48, Valve 2 and Valve 3. The two forward horizontal ATM actuators 36 are also controlled together from a single hydraulic control valve 48, Valve 4. The two aft ATM actuators 36 are individually controlled by dedicated hydraulic control valves 48, Valve 5 and Valve 6. The six valves 48 provide fluid flow to the eight actuators 36 to control the position of the gearbox 22 relative to the helicopter's airframe in the three linear directions and about the three axes of rotation. Alternatively, each ATM actuator 36 may be associated with its own dedicated valve 48 so that the controller 44 and the actuation system 46 can vary the operational characteristics of each actuator individually. However, such individual actuator control has been found to be unnecessary and may be counterproductive. With eight control valves for the eight actuators, it is possible for the actuators to oppose one another resulting in excessive control and inefficient use of the hydraulic system 46 provided by the ATM system 34.

Figure 11:
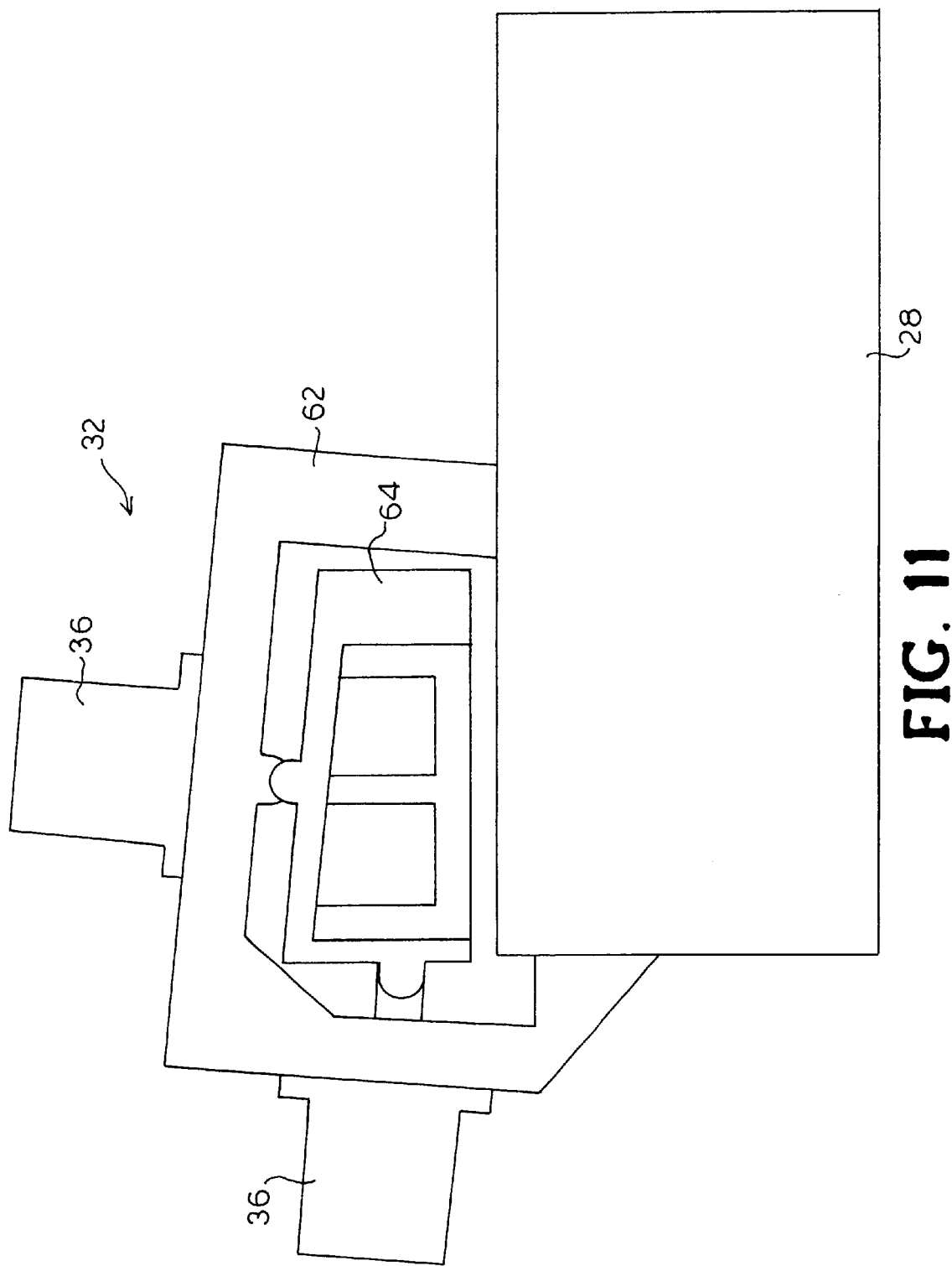
FIG. 11 is a schematic representation of an active transmission mount connected to an aircraft frame and transmission gearbox foot according to the present invention.
Figure 12:
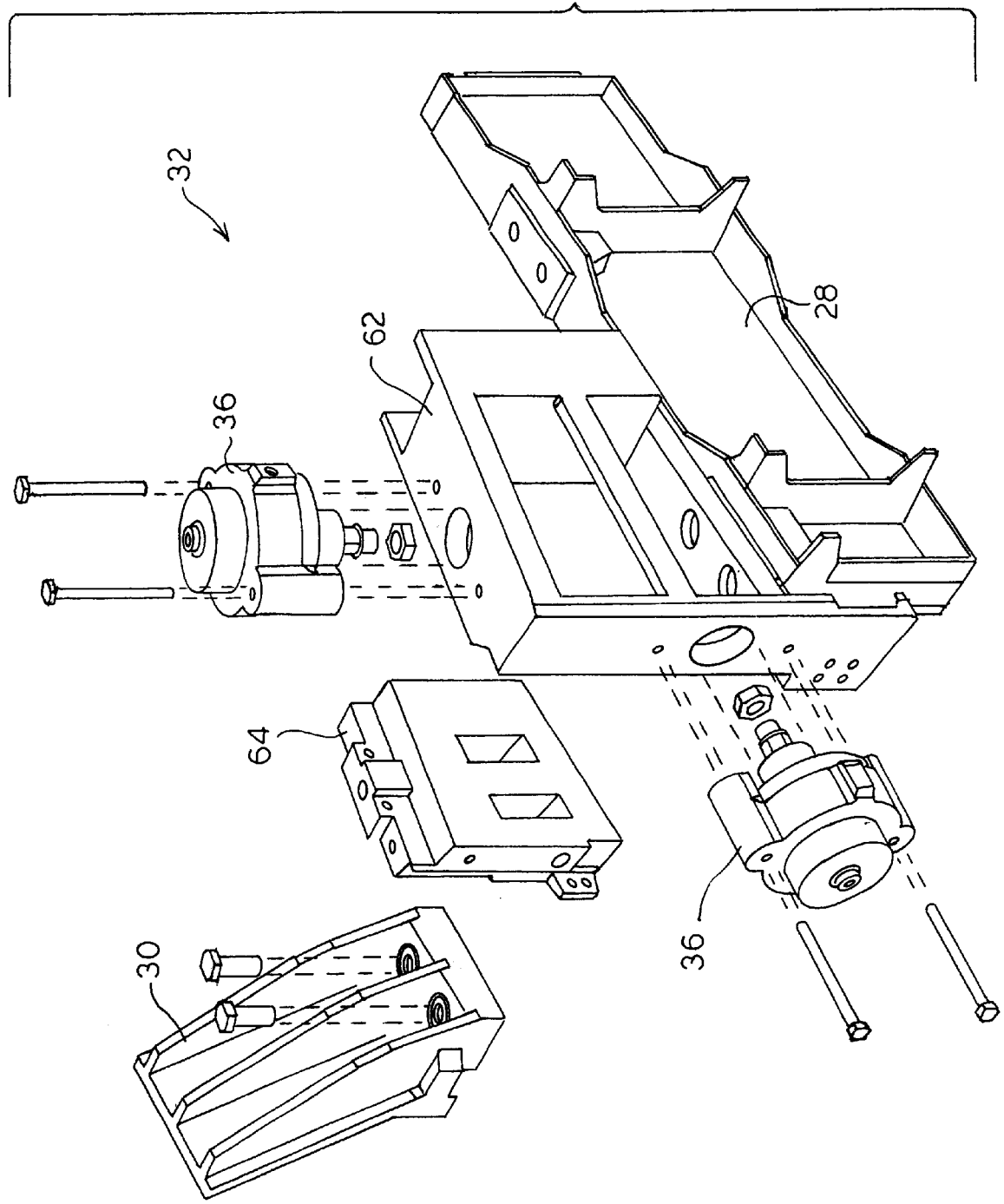
FIG. 12 is an exploded view of an active transmission mount connected to an aircraft frame and transmission gearbox foot according to the present invention.
Figure 13:
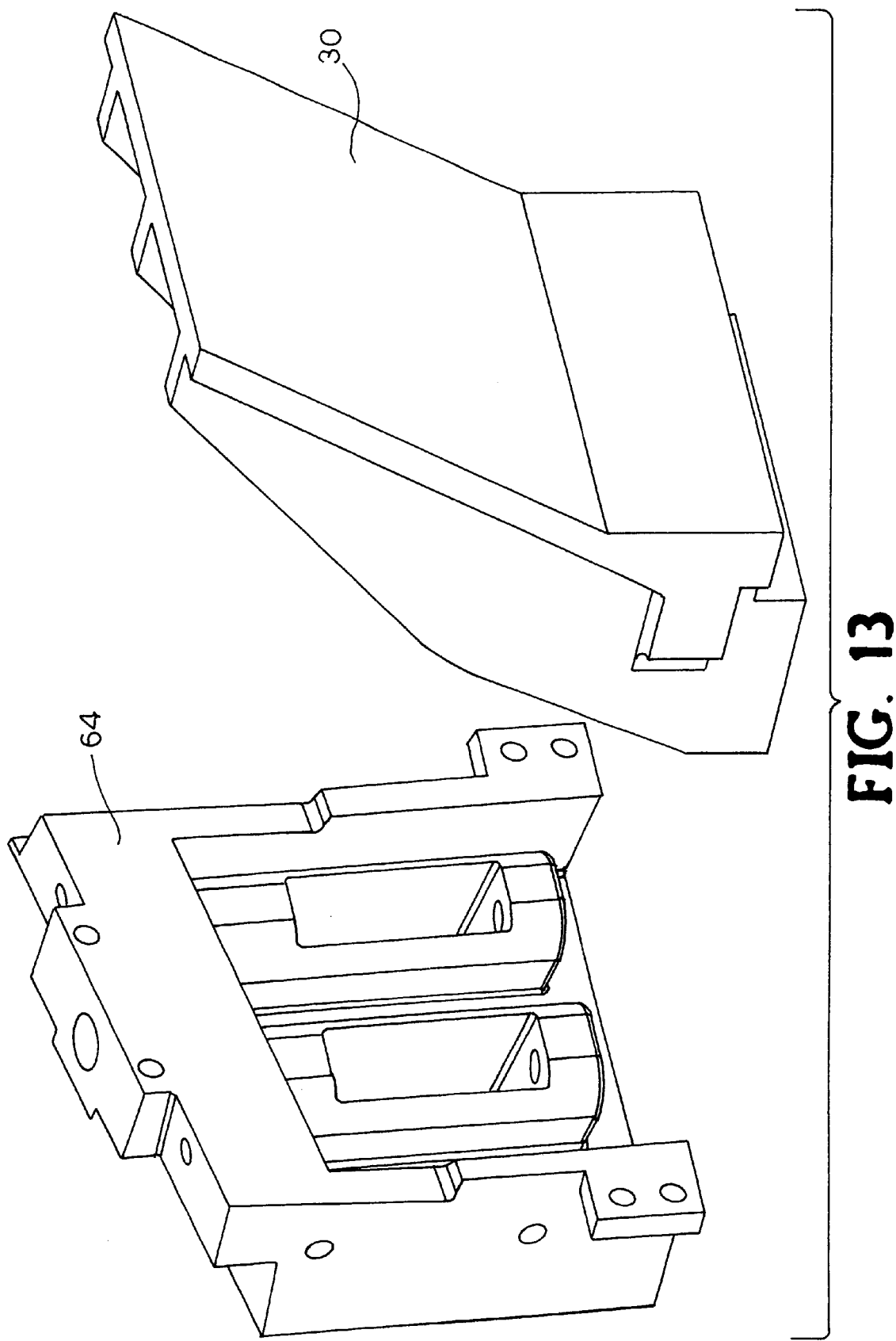
FIG. 13 is an exploded view of the transmission gearbox foot and foot attachment for an active transmission mount shown in FIG. 12.

FIGS. 11–13 illustrate the attachment of a gearbox mounting foot 30 to the airframe 28 using the ATM 32. As shown schematically in FIG. 11, the mounting foot 30 is connected to the ATM 32 and the ATM is connected to the airframe 28. The ATM 32 comprises an isolation frame 62 and a foot attachment 64. The isolation frame 62 is fixed to the helicopter's airframe 28 and surrounds the foot attachment 64. The gearbox mounting foot 30 is connected directly to the foot attachment 64 which is suspended from the isolation frame 62 by two ATM actuators 36 mounted on the isolation frame. One ATM actuator 36 is shown positioned substantially vertically on top of the isolation frame 62 and controls the vertical movement of the foot attachment 64. However, depending on the mounting configuration, the vertical ATM actuator 36 could also be located below the mounting foot 30. The other ATM actuator 36 is positioned substantially horizontally on a side of the isolation frame 62 and substantially parallel to the longitudinal axis of the helicopter for controlling the horizontal movement of the foot attachment 64. FIG. 11 shows how the ATM 32 structurally isolates the foot attachment 64, and thus the gearbox foot 30, from the airframe 28. FIG. 12 shows a detailed, exploded view of the ATM 32. FIG. 13 is an exploded view of the transmission gearbox foot 30 and foot attachment 64 from the opposite direction.

Figure 14:
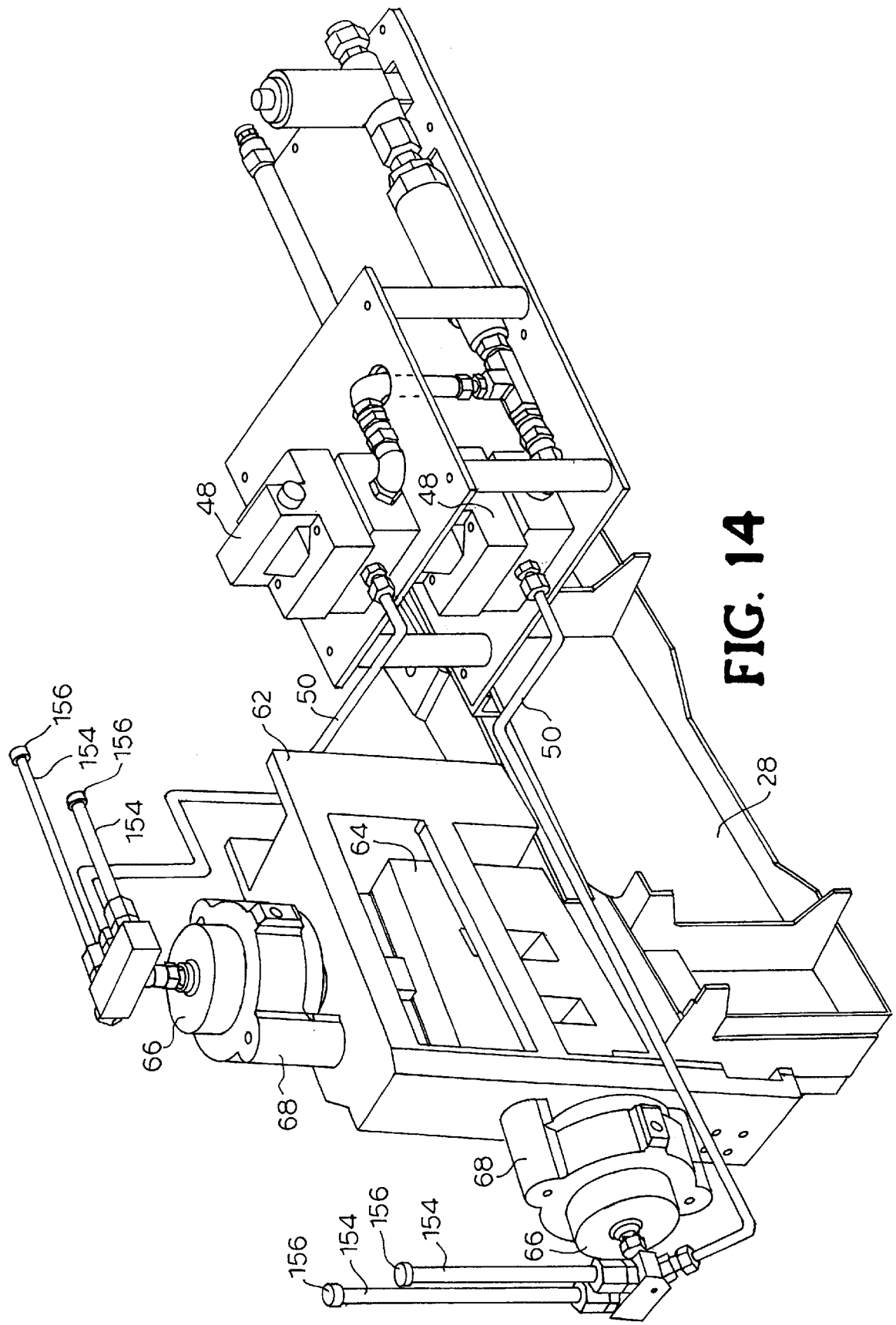
FIG. 14 is a cutaway perspective view of the hydraulic actuation system for a gearbox mounting foot.
Figure 15:
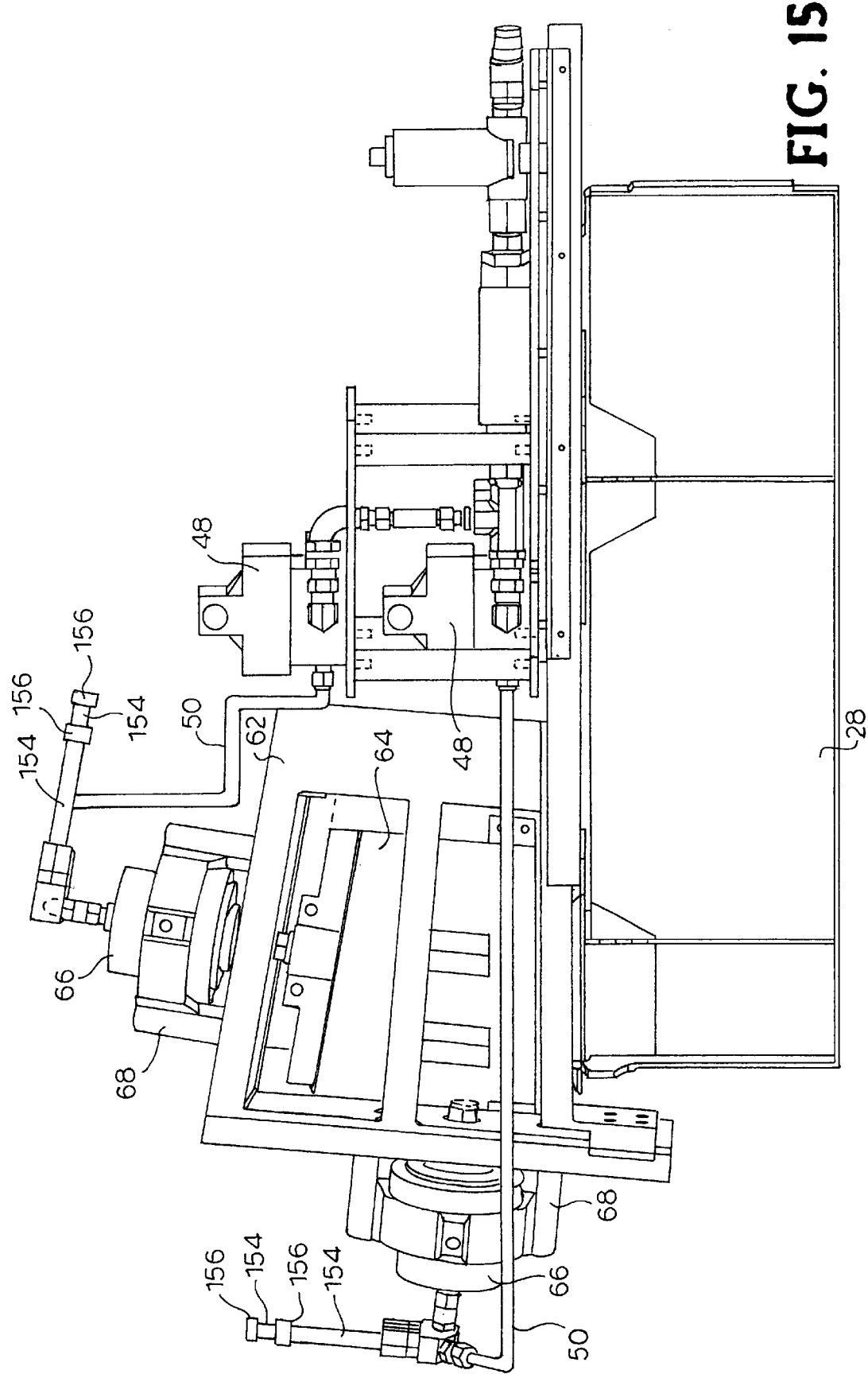
FIG. 15 is side elevation view of the hydraulic actuation system shown in FIG. 14.

A preferred arrangement of the ATM 32 with associated hydraulic valves 48 according to the present invention is shown in more detail in FIGS. 14 and 15 relative to one of the aft mounting feet 30. Each ATM actuator 36 has a dedicated valve 48. The passive noise isolator 58 is depicted as a tuned stub as assembly, described more fully below.

As discussed above, hydraulic fluid flow to the ATM actuator 36 is actively oscillated to reduce the vibration transmitted from the gearbox feet 30 to the airframe. However, the quasi-static flight loads and displacements must be transmitted to the airframe. The applied quasi-static flight loads can change in magnitude and direction at frequencies up to 2 Hz depending on pilot inputs into the aircraft. Hence, the actuator 36 must be designed to accommodate the transmission of these large quasi-static flight loads. The magnitude of these loads can be quite high, approximately representing the aircraft weight amplified by the maneuver the aircraft is undergoing. For example, in a Sikorsky Aircraft Corporation S-76® aircraft, the quasi-static flight loads have a magnitude of about 8000 lbs. on each actuator 36. The ATM actuator 36 must be designed to accommodate such loads while limiting gearbox motions to only about ±0.050 inches about a static position in order to avoid excessive misalignment of the engine transmission shaft. The ATM actuator 36 according to the present invention is also designed to prevent transmission to the airframe of small vibratory loads, e.g., 500 lbs. between about 16 Hz and about 50 Hz. These are the vibratory loads which cause the vibrations that are the most bothersome to the passengers and crew within the aircraft.

The actuator 36 is also designed to passively isolate the vibratory and acoustic loads which are applied transverse to the central longitudinal, or "active", axis of the actuator. This is achieved by designing the actuator 36 so that the transverse stiffness of the actuator is low through the use of elastomeric bearing elements, discussed in greater detail herein below. Due to the configuration of the two actuators 36 at each foot 30, each actuator's transverse axis is the other actuator's active axis. Thus, the actuator's 36 transverse axis may be passive because the other actuator 36 accommodates a particular load along that axis.

Figure 16:
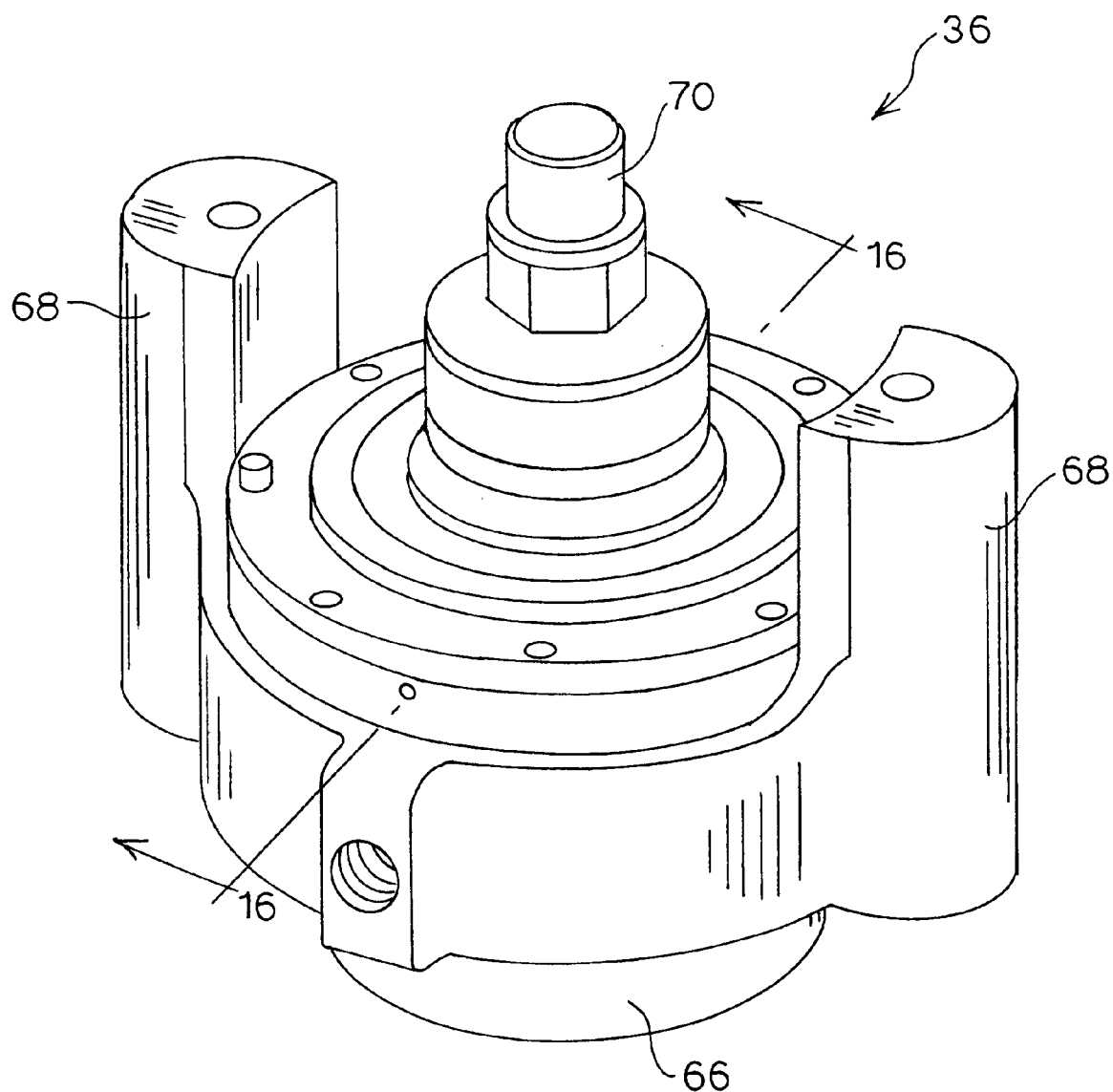
FIG. 16 is an isometric view of one embodiment of an actuator according to the present invention.

A preferred hydraulic ATM actuator 36 for use in accordance with the present invention is shown in FIG. 16. The actuator 36 includes a housing 66 with a mounting flange 68 for attaching the actuator 36 to the airframe or a support structure. The actuator 36 also includes a mounting member 70, depicted a threaded stud, that is configured to attach to the gearbox foot attachment 64. It is understood that other methods of attachment may be used with the present actuator design.

Figure 17:
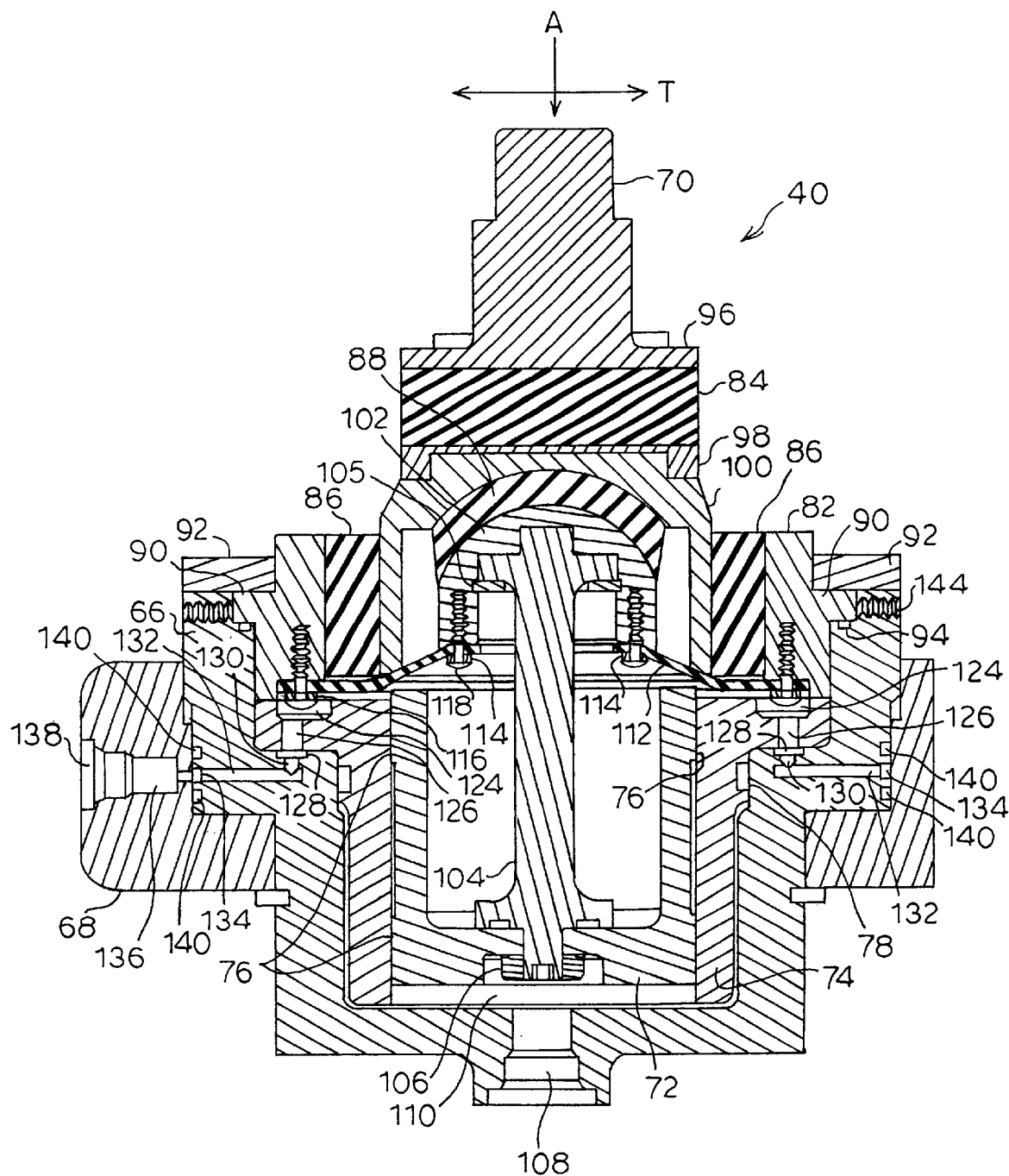
FIG. 17 is a cross-sectional view of the actuator shown in FIG. 16 taken along line 16—16.
Figure 18:
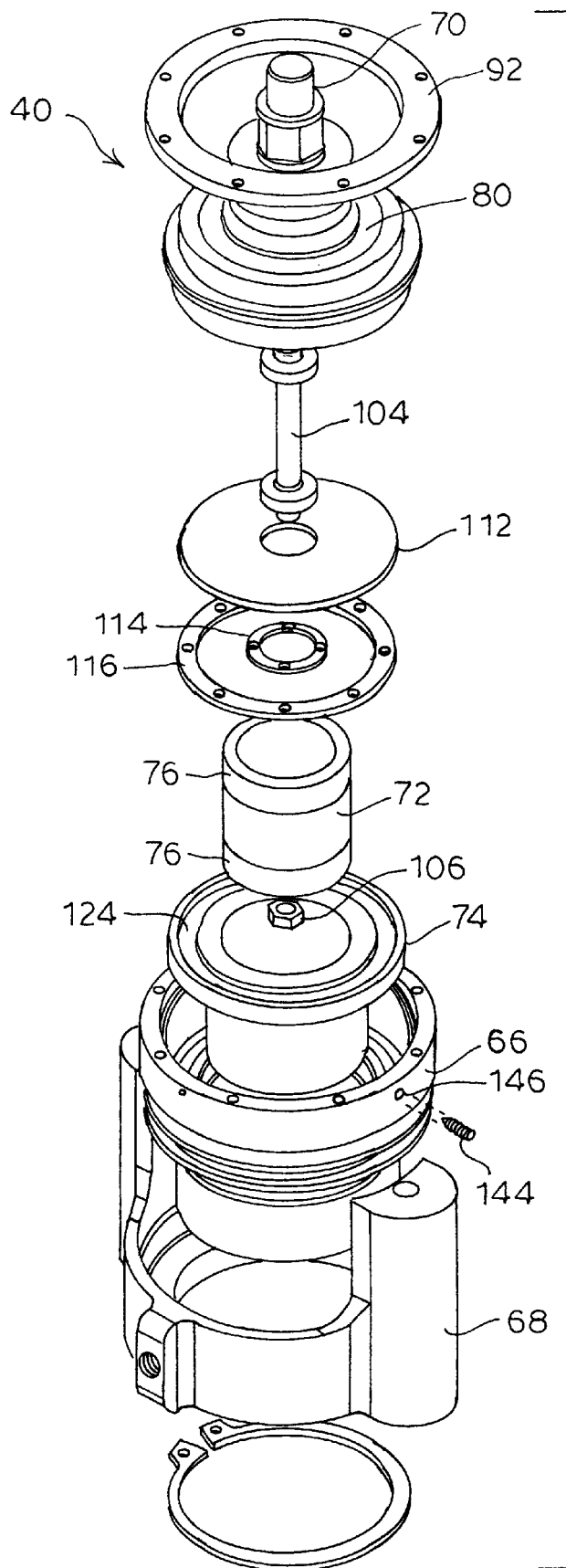
FIG. 18 is an exploded view of the actuator shown in FIG. 16.

Referring to FIGS. 17 and 18, the mounting member 70 is attached to a piston 72 which is adapted to slide within a sleeve 74 which is secured within a recess in the housing 66. The actuator 36 is preferably a lap-fit type actuator. Lap-fit actuators are well known in the art. Lap-fit actuators do not include any sliding seals. Instead, the lap-fit actuator is designed with extremely close tolerances (i.e., millionths of an inch) between the piston and the outer sleeve. As such, there is a close sliding engagement between the outer surface of the piston 72 and the inner surface of the sleeve 74. Those skilled in the art of actuators are well aware of the design specifics of a lap-fit type piston arrangement and, therefore, no further details are needed. Suitable lap-fit piston and sleeve assemblies are available from Moog Inc., of East Aurora, N.Y., U.S.A.

Since manufacturing a piston 72 to meet the tolerances needed for a lap-fit is difficult, the outer surface of the piston in the present embodiment is formed with two raised annular surfaces 76 which provide the close sliding engagement between the piston and the sleeve 74. A static seal, such as an O-ring 78, is located between the sleeve 74 and the housing 66 to prevent hydraulic fluid from passing therebetween.

As described above, the actuator 36 undergoes both axial and transverse loads and motions. The loads and motions applied by the transmission foot 30 to the actuator 36 through the stud 70 comprise an axial quasi-static load and vibratory motion along "A", and transverse vibratory motion along "T". As described above, the quasi-steady axial load on a typical S-76® aircraft manufactured by Sikorsky Aircraft Corporation is approximately 8,000 pounds. The vibratory motion along "A" and "T" is approximately ±0.050 inches which stems from allowing the transmission to move in its own inertial frame. The transverse vibratory motion produces a transverse vibratory load transmitted to the airframe whose magnitude is governed by the inherent stiffness of the elastomeric bearing assembly. In the S-76® aircraft, this load is about 75 pounds. The combined axial loads and transverse motions result in a shear loading and a moment loading on the actuator 36. The shear and moment loads on the actuator 36 cause transverse loads and cocking moments on the lap-fit piston 72. Lap-fit type pistons 72 are not intended to see these types of loads since such loads can cause the piston to bind up and wear quite rapidly. Thus, a lap-fit piston could not be used in a conventional actuator 36 to react these applied loads. However, the present invention utilizes a novel bearing assembly 80 which is designed to react the shear and moment loads applied to the actuator 36 by the gearbox foot 30 and prevent the loads from being fully imparted to the lap-fit piston 72.

Figure 19:
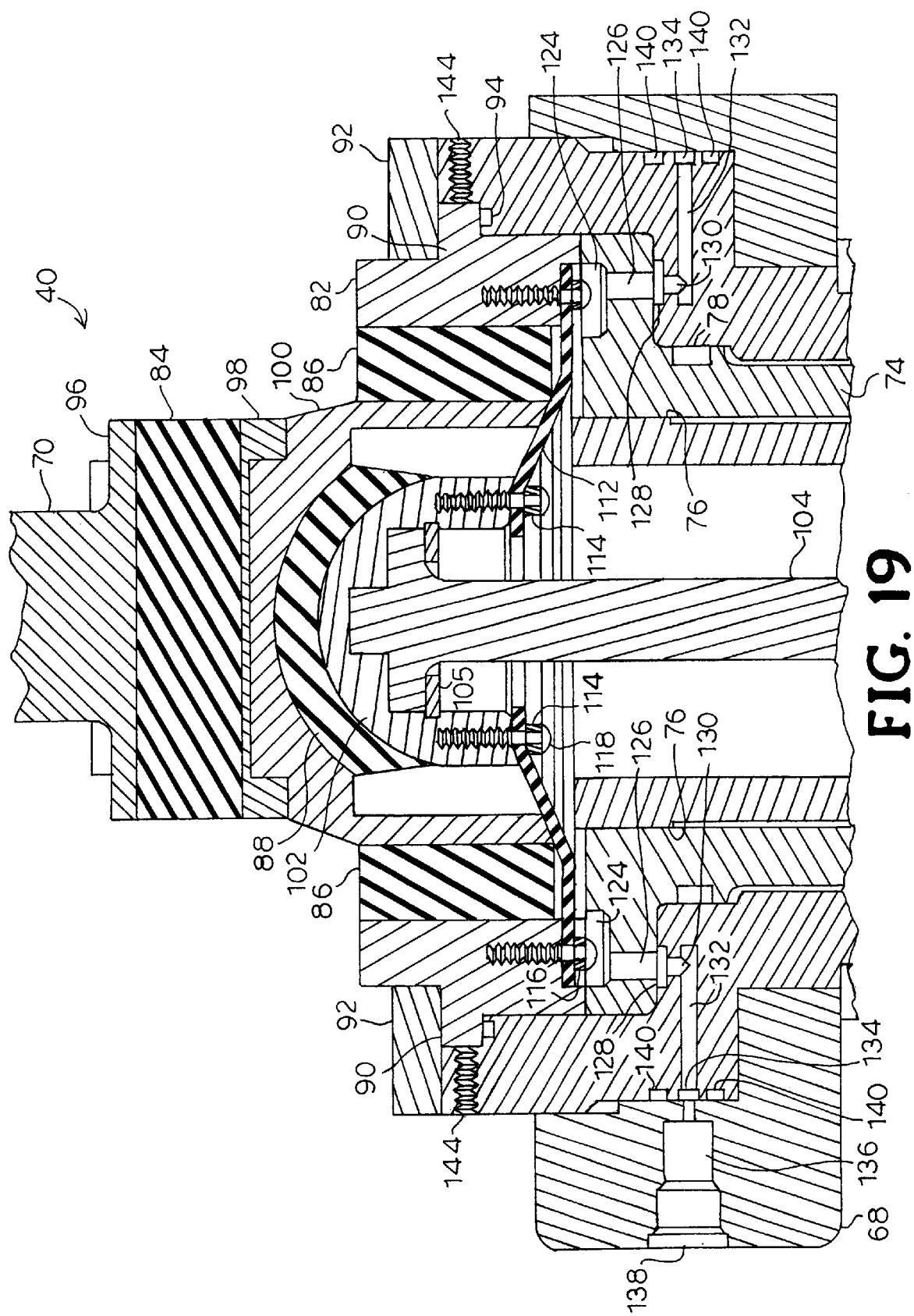
FIG. 19 is an enlarged view of a portion of the actuator shown in FIG. 17.
Figure 20:
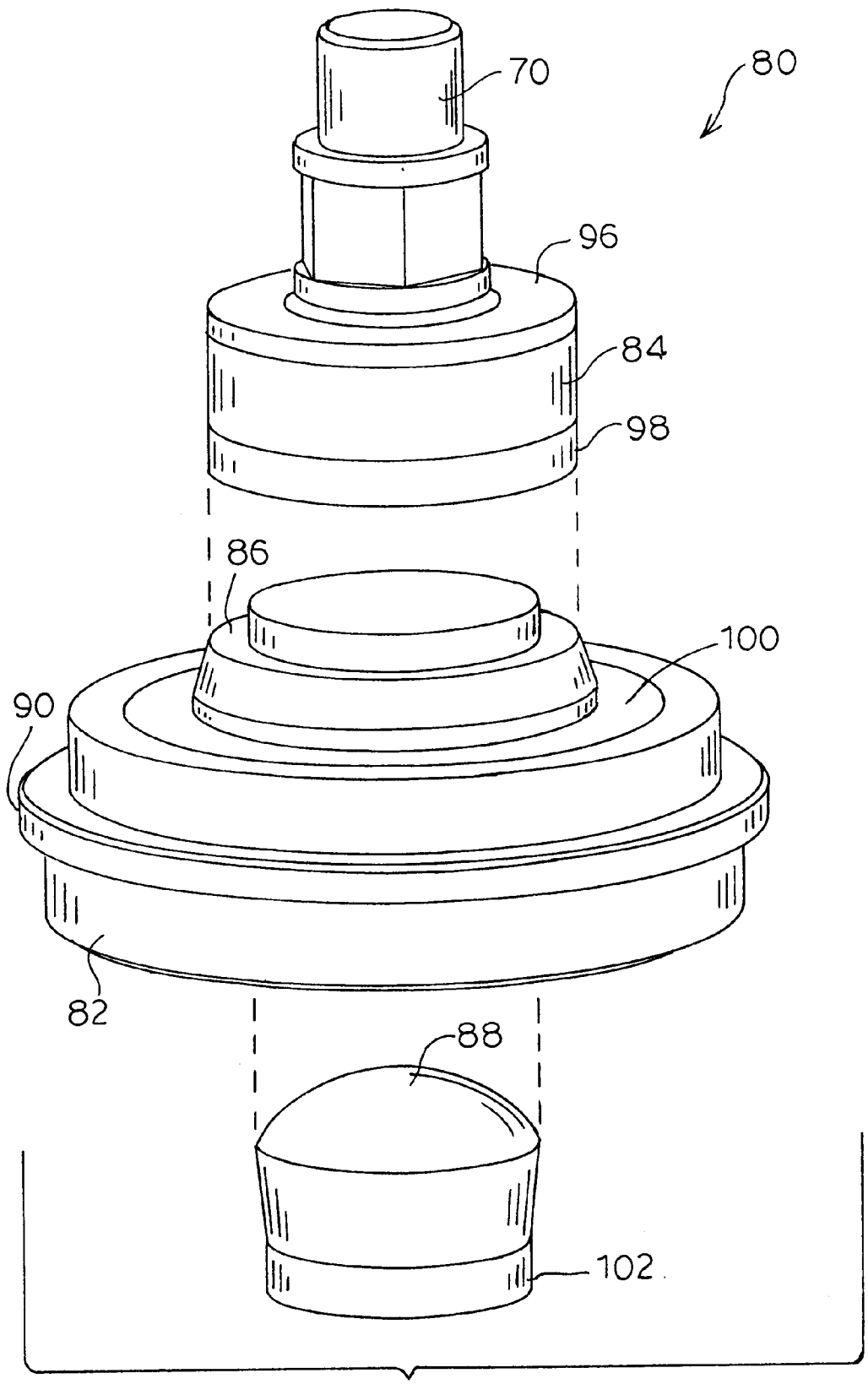
FIG. 20 is an exploded view of the bearing assembly shown in FIG. 18.

As best seen in FIGS. 19 and 20, the bearing assembly 80 is located on top of the sleeve 74 and generally comprises an outer bearing member 82 which partially houses or supports three resilient bearings: a thrust bearing 84, a radial journal bearing 86, and a spherical bearing 88. The outer bearing member 82 is partially housed within the housing 66. The outer bearing member 82 is attached to the housing 66 using any conventional method. In the illustrated embodiment, the outer bearing member 82 has an integral flange 90 which contacts the upper end surface of the housing 66. A clamping ring 92 fits over the flange 90 and is attached to the housing 66 with conventional fasteners (not shown) thereby securing the bearing assembly 80 and sleeve 74 in the housing 66. The flange 90 presses against an O-ring 94 seated in an annular groove in the top of the housing 66. In one embodiment of the invention, the housing 66 and clamping ring 92 are made from stainless steel material, although aluminum is preferable. The stud 70 is preferably made from aluminum material. The piston 72 and sleeve 74 are preferably made from stainless steel.

The thrust bearing 84 is mounted below the stud 70 and is preferably a substantially planar elastomeric bearing. Elastomeric bearings are well known in the art and generally comprise alternating layers of elastomer and nonresilient metal shims (not shown). The number of elastomer layers and shims is determined by the applied loads and desired flexibility of the elastomeric bearing. A suitable bearing assembly for use in the present invention is manufactured by Lord Corporation of Cary, N.C., U.S.A. The thrust bearing 84 is designed to be stiff, or rigid, in the axial direction and soft, or flexible, in the lateral or transverse direction. In one preferred embodiment, the thrust bearing has an axial stiffness greater than about 300,000 lbf/in, and a transverse stiffness less than about 1,000 lbf/in. The thrust bearing 84 is preferably located between and attached to the inner end of the stud 70 and a thrust mounting plate 98. The attachment of the bearing 84 to the stud 70 and the mounting plate 98 is through any conventional means, such as an elastomer to metal adhesive.

The thrust mounting plate 98 is attached to or formed on the upper end of an inner bearing member 100. At least a portion of the lower end of the inner bearing member 100 is located within the outer bearing member 82. The radial journal bearing 86 is located between the inner bearing member 86 and the outer bearing member 82 and is preferably a substantially cylindrical elastomeric bearing. The radial journal bearing 86 is preferably stiff in the radial direction and soft axially. In one preferred embodiment, the radial journal bearing 86 has a radial stiffness greater than about 300,000 lbf/in, and an axial stiffness less than about 3,000 lbf/in.

The spherical bearing 88 is located within and engages with an inner spherical surface of the inner bearing member 100. The spherical bearing 88 fits over and is attached to a spherical bearing support 102. The spherical bearing 88 is preferably an elastomeric bearing which is stiff axially and soft rotationally. In one preferred embodiment, the spherical bearing has an axial stiffness greater than about 500,000 lbf/in, and a rotational stiffness less than about 15 in-lbf/deg. The spherical bearing support 102 is engaged with the piston 72 through a piston rod 104, or stinger. The piston rod 104 is preferably made from a metallic material, such as steel, and is attached to the spherical bearing support 102 and piston 72 through any conventional means known to those skilled in the art, such as a snap ring 105 and bolted connection 106, respectively.

When the bearing assembly 80 is assembled, the centers of rotation of the spherical bearing 88 and the radial journal bearing 86 are as close as possible (e.g., <0.03 inches). This coincidence of centers of rotation is required to ensure stability of the elastomeric bearing assembly 80 and avoid buckling of the ATM actuator 36 under axial load. Additionally, the centers of rotation of all three elastomeric bearings 84, 86, 88 are as nearly co-axial as possible (e.g., <0.03 inches). Further, the co-axial centers of rotation are substantially coincident along the longitudinal axis of the piston 72. In this way, offsets in centers of rotation do not combine with the high quasi-static axial load to produce large transverse loads on the piston 72 and sleeve 74.

The preferred bearing assembly 80 provides a novel mechanism for reacting to and isolating transverse motions (e.g. vibrations and noise) stemming from the gearbox foot 30 from creating transverse loading on the piston 72 and sleeve 74. As stated above, the applied transverse motions result in shear and moment loads on the stud 70 which can then ripple through a bearing assembly. Additionally, transverse motions together with the high quasi-static loads along the longitudinal axis of the ATM actuator 36 further increase moment loads on the stud 70. For a properly designed bearing assembly 80, shear loads caused by transverse motions are low due to the low transverse stiffness of the thrust bearing 84. The low shear loads are then further prevented from coupling into the piston 72 and sleeve 74 due to the high transverse stiffness of the radial journal bearing 86 which protects the inner bearing member 100 from radial motion with respect to the outer bearing member 82. Moments placed on the stud 70 due to the shear and off center quasi-static loads are prevented from reaching the piston 72 and sleeve by the spherical bearing 88, which is very soft rotationally. As a consequence, only small moments are transferred through the spherical bearing 88 to the spherical bearing support 102 and, thus, to the piston rod 104. The lower end of the piston rod 104 reacts to these small moments as a small transverse or side load between the piston 72 and sleeve 74. Further, the design of the bearing assembly 80 is such that axial loads are transmitted through the thrust bearing 84 and spherical bearing 88 directly to the piston 72. The cumulative axial stiffness of the thrust bearing 84 and the spherical bearing 88 must be as high as possible, preferably, greater than 100,000 lbf/in, to preclude excessive compression of these members under quasi-static load. Excessive compression would cause unwanted flow demands upon the hydraulic valve 48 and the supply 54.

Pressurized hydraulic fluid is channeled through an inlet 108 to a chamber 110 and against the head of the piston 72. Since a lap-fit piston does not include seals, pressurization is obtained by a close-fit sliding interface between the piston 72 and the sleeve 74. However, even with this close fit, hydraulic fluid will escape between the piston 72 and the sleeve 74 as the piston 72 moves relative to the sleeve 74. Hydraulic fluid can damage the elastomeric material of the bearing assembly 80.

According to the present invention, a diaphragm 112 is provided for physically separating the bearing assembly 80 from the sleeve 74 and the piston 72 and substantially preventing slightly pressurized hydraulic fluid which leaks past the piston 72 from contacting the bearing assembly 80. As seen in FIG. 18 the diaphragm 112 is flat and ring-shaped, and is made from a material that is benign to the hydraulic fluid used. For example, nitral rubber is suitable for use with Mil-H-5606 fluid.

The inner diameter of the diaphragm 112 (FIG. 19) is attached to the spherical bearing support 102 and the outer diameter is attached to the outer bearing member 82. Two annular sealing rings 114, 116 are bonded with urethane to the inner and outer edges of the diaphragm 112 on the piston side. Additional urethane and peripherally-arranged machine screws 118 through the two sealing rings 114, 116 bond the inner and outer edges of the diaphragm 112 to the spherical bearing support 102 and the outer bearing member 82, respectively. Thus, a tight seal is formed between the diaphragm 112 and the spherical bearing support 102 and between the diaphragm 112 and the outer bearing member 82. This tight seal prevents migration of hydraulic fluid from the piston side of the diaphragm 112 to the bearing side of the diaphragm. As the piston 72 moves, the diaphragm 112 accommodates slight stretching without undue stress.

The space 120 between the diaphragm 112 and components of the bearing assembly 80 are preferably filled with polybutene. Polybutene is preferred because it is benign to natural rubber, is not petroleum based, never hardens, is non-toxic, and does not react unfavorably with the elastomer used in the bearing assembly 80. The polybutene also prevents excessive deformation of the diaphragm 112 when subjected to the low pressure caused by leakage of hydraulic fluid past the piston 72. Excessive deformation of the diaphragm 112 would risk excess stress along the sealed edge surfaces of the diaphragm 112.

The present invention also accounts for leakage of hydraulic fluid past the piston 72. As seen in FIG. 19, the upper end of the sleeve 74 has an outward flange having an annular groove 124 spaced from the periphery of the flange. A plurality of axial openings 126 in the groove 124 pass through the flange portion of the sleeve 74. The openings 126 communicate with a corresponding annular groove 128 in the housing 66. The housing 66 also has a plurality of axial openings 130 each leading to a radial passage 132. The passages 132 opens into a circumferential groove 134 in the outer periphery of the housing 66.

A fluid outlet passage 136 in the mounting flange 68 communicates with the groove 134. The fluid outlet passage 136 receives a hydraulic fitting 138 which connects to a drain line (not shown) to remove the leaked fluid. Two additional outer circumferential grooves 140 in the housing 66 flank the fluid receiving groove 134. Sealing o-rings 142 are located in each of the two outer circumferential grooves 140 to prevent hydraulic fluid from leaking between the housing 66 and mounting flange 68. Therefore, leaked hydraulic fluid has a free flow path from the sleeve 74 to the periphery of the housing 66. Moreover, because the hydraulic fitting 138 located on the mounting flange 68 is always in fluid communication with the central circumferential groove 134 regardless of the relative rotational positions of the sleeve 74 and the mounting flange 68, the hydraulic fitting 138 is always properly placed with respect to the pre-formed and pre-fitted drain line. There is no rotational positioning requirement for the sleeve 74.

During assembly of the actuator 36, it is important that the axis of the sleeve 74 be concentrically located with respect to the central axis of the bearing assembly 80 so that the axial quasi-static load applied to the stud 70 is directed along the central axis of the sleeve 74. Therefore, the location of the bearing assembly 80 with respect to the axis of the sleeve 74 is a critical assembly parameter.

To ensure alignment of the bearing assembly 80 and the sleeve 74 an intermediate reference surface is needed. The reference surface 147 is an internal diameter of the housing 66. During manufacture of the sleeve 72 the concentricity of the sleeve bore which accepts the piston 72 is held to within about 0.0005 inches of the sleeve's outside diameter which in is contact with the reference surface 147. Additionally, the outside diameter of the sleeve is held to within 0.003 inches of the diameter of the reference surface 147. During manufacturing of the outer bearing member 82, the outside diameter of the outer bearing member is also held to within 0.003 inches of the diameter of the reference surface 147. During manufacturing of the bearing assembly 80, the total runout of the inner bearing member 86, spherical bearing support 102, and stud 70 is held to within 0.002 inches relative to the outer diameter of the outer bearing member 82. Adherence to these tolerance will ensure that stability of the ATM actuator is maintained and side loads between the sleeve 74 and piston 72 remain low.

Figure 21:
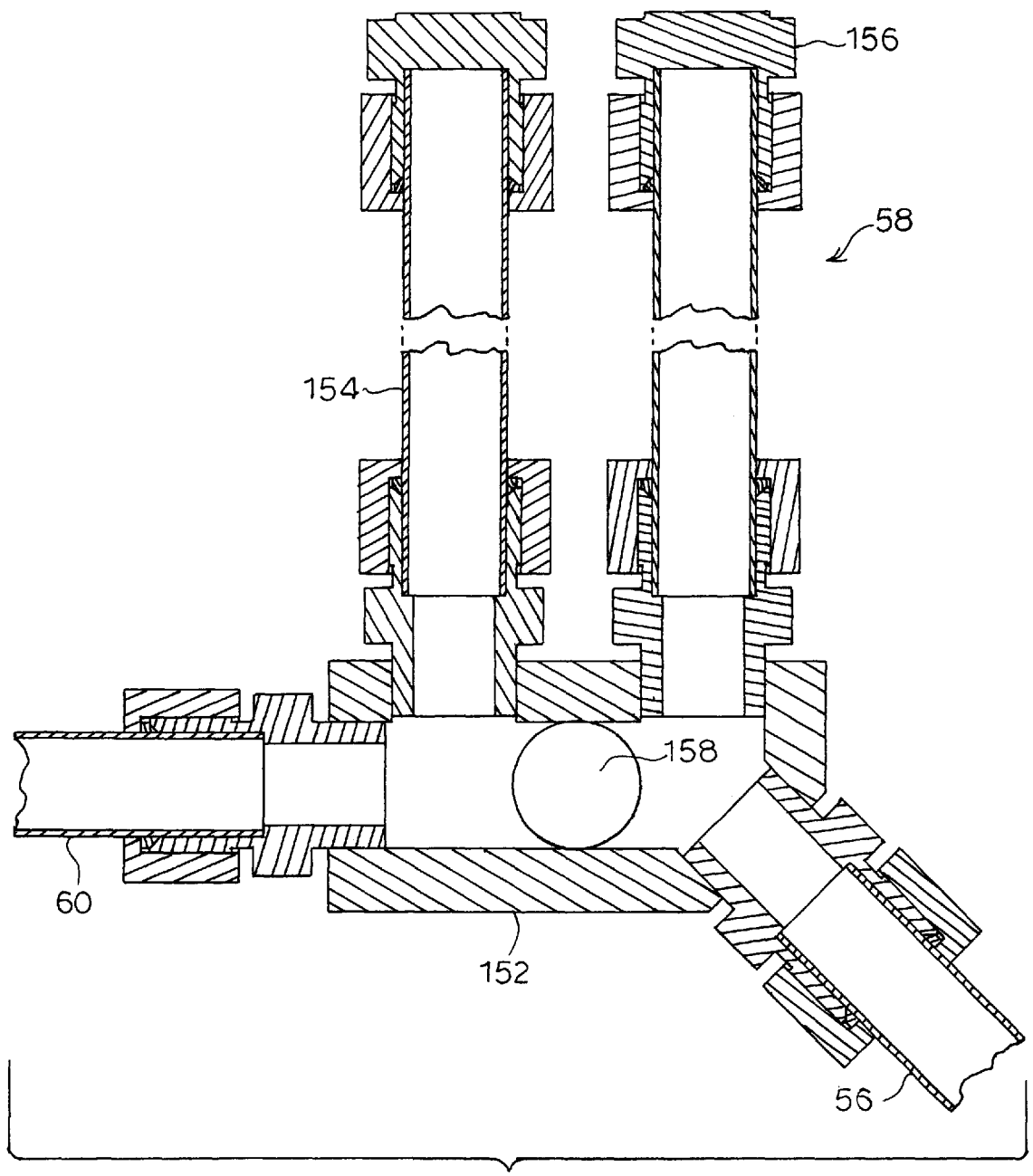
FIG. 21 is a close-up cross-sectional view of a tuned stub assembly.

The passive isolator 58 comprising the tuned stub assembly is shown in FIG. 21. The tuned stub assembly comprises a manifold 152 and two tubes 154 connected to the manifold. One end of each tube 154 opens into the manifold 152 and the other end of the tube is closed using a compression cap 156. The hydraulic line 56 from the valve 48 enters one side of the manifold 152 and a hydraulic line 158 exits the manifold 152 for carrying fluid to the ATM actuator 36. The connections all comprise compression fittings, although any fluid-tight connection is suitable. The tube 154 are preferably a stiff material such as steel, which is otherwise ordinarily used in hard plumbed hydraulic systems. Although two tubes 154, or "stubs", are shown, the number of stubs 154 used depends on the number of tonal frequencies desired to be reduced.

The tuned stubs 154 operate on the well known principle of standing compressional waves within a tube closed at one end. The tuned system has a very low impedance to small movements of fluid at the mouth of the tube that move at the natural frequencies of the tuned stub. Therefore, when tuned to vibratory pressure waves at a particular frequency, the stiffness of the fluid at the mouth of the tube appears to be low, which translates into an apparently low stiffness at the associated hydraulic actuator. In a helicopter application, the stubs are tuned to reduce the "gear clashing" fundamental frequency and its odd integer tonal frequencies. The number of teeth on the gears and the speed of the gears determine the gear clashing frequencies. This frequency is high compared to that of vibrations, typically greater than 500 Hz, although somewhat lower frequencies are occasionally experienced.

The fundamental resonant frequency of the stub to which the stub is "tuned" is a function of the speed of sound in the hydraulic fluid and the tube's length and is calculated as follows:

$$f = \frac{c}{4L}$$

where
   $f$=target frequency (Hz)
   $c$=the speed of sound in the hydraulic fluid (m/s)
   $L$=fluid path length from the entrance of the fluid into the actuator to the inside surface of the tuned stub cap (m)

Since the target frequency and the speed of sound in the fluid are known, the fluid path length is calculated to determine the length of the tube. For example, assuming a stiffness null is needed at 1 kHz and the speed of sound in the hydraulic fluid is 1450 m/s, solving the equation above for L yields a fluid path length from the actuator to the cap of 0.363 m (14.3").

The addition in the fluid column of elbows, constricted areas, varying diameters, and the like, all lead to complex hydraulic dynamics which worsen as frequency increases. Therefore, it is preferable that the piping length from the actuator to the tuned stub be as short as possible to minimize the complexity of the hydraulic dynamics and ensure the hydraulics at the actuator is soft at the tonal frequencies. This "softness" is based on the ability for the fluid in the chamber 110 to communicate with the fluid at the mouth of the tuned stub 154 in the manifold 152. Therefore, the stub 154 is preferably as close to the hydraulic fluid inlet 108 as possible so there is no interaction due to elbows, fluid line diameter reductions, and the like, which introduce, in addition to complexity, damping effects reducing the stiffness null and thereby decreasing the effectiveness of the tuned stub.

Figure 22:
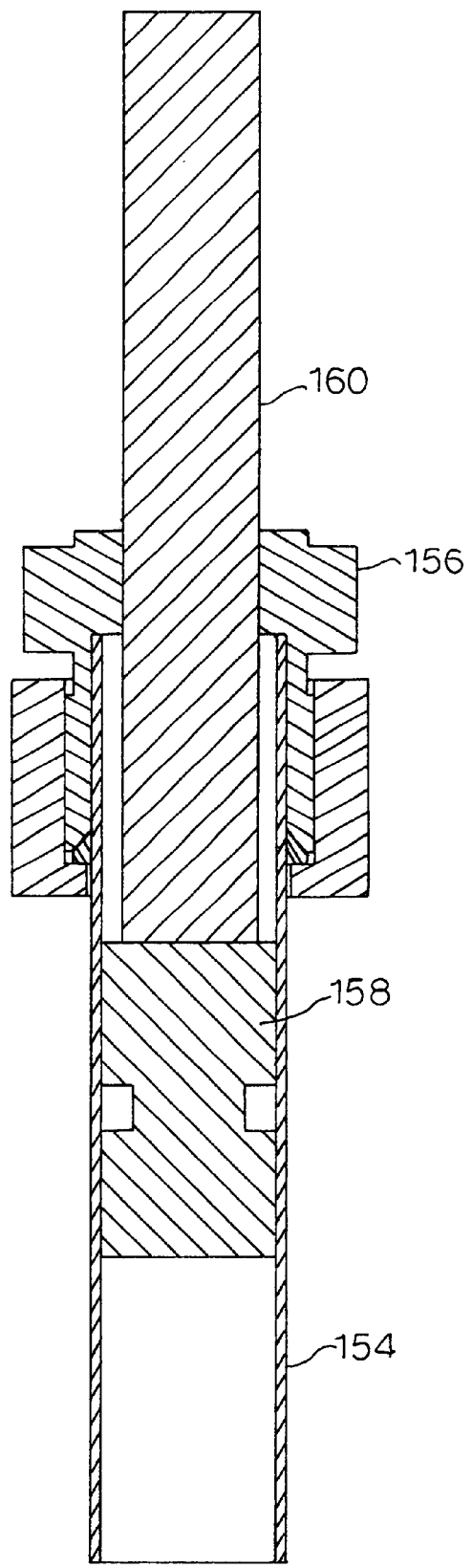
FIG. 22 is a close-up cross-sectional view of a tuned stub with an adjustment screw assembly.

During initial design, the tube length can also be accurately determined using a compression cap 156 with a movable piston 158 having a diameter equal to that of the inside diameter of the tube. FIG. 22 illustrates the compression cap 156 with a threaded central hole for receiving a threaded rod 160 attached to the top of the movable piston 158. The threaded rod 160 extends from the movable piston 158 through the compression cap 156 and is accessible from outside of the tube 154 for moving the piston in the tube and effectively adjusting the fluid column length (L). Once the appropriate fluid length is found creating a null in the stiffness at the desired frequency, the rod 160 and piston 158 are removed and the tube is cut to length so that the inside surface of the compression cap 156 is at the same position as the piston 158.

The preferred inside diameter of the tuned stub 154 relates to the diameter of the piston 72 of the actuator 36. This is because the stiffness of the tuned stub as seen by the actuator scales as the ratio of the piston 72 cross-sectional area to the cross-sectional area of the tuned stub 154 squared:

$$K_{actuator} = \left(\frac{A_{piston}}{A_{stub}}\right)^2 K_{stub}$$

Practically, one can expect to achieve a 10:1 reduction (~20 dB) of the entrained fluid static stiffness using a tuned stub 154. The reduction is primarily limited by damping which results from subtle causes such as burrs on tubes and fittings, exposed internal threads, slight changes in fluid column diameter, and the like, that lead to turbulence in the line. Thus:

$$\frac{K_{dynamic}}{K_{static}} = \frac{1}{10}$$

Since $K_{dynamic}$ is the dynamic stiffness of the stub at the tuned frequency and $K_{static}$ is the static stiffness of the stub, $$K_{actuator} = \left(\frac{A_{piston}}{A_{stub}}\right)^2 \frac{K_{static}}{10}$$

$K_{static}$ is calculated as follows:

$$K_{static} = \frac{\rho c^2 A_{stub}}{L}$$

where
 $\rho$=fluid density (kg/m$^3$)
 c=the speed of sound in the hydraulic fluid (m/s)
 L=fluid path length from the actuator to the tuned stub cap (m)
 $A_{stub}$=cross-sectional area of stub (m$^2$)
Therefore, $$K_{actuator} = \frac{A_{piston}^2}{A_{stub}} \frac{\rho c^2}{10L}$$

Solving for the cross-sectional area of the stub:

$$A_{stub} = \frac{A_{piston}^2}{K_{actuator}} \frac{\rho c^2}{10L}$$

leads to the stub's inner diameter for optimal noise reduction.

The tuned stubs isolate noise due to high frequency transmission gear clashing by providing low mechanical stiffness at selected frequencies where high levels of noise occur. The value used for $K_{actuator}$ is unique to each make and model of helicopter. In general terms, one needs to determine the airframe stiffness at the frequency of interest as seen by the gearbox foot along the active axis of the ATM actuator 36, $K_{actuator}$ is then set at 1/10. For the ATM system for the S-76® helicopter, $K_{actuator}$ was <60,000 lbf/in.

Overall, the ATM system acts as a filter, creating low stiffness regions in the transmission's mounting stiffness at selected frequencies of interest. The effect is to decouple the shaking transmission at those frequencies from the helicopter's airframe. At frequencies of the vibration and noise generated within the transmission itself, the actuator system makes the stiffness seen by the transmission feet, looking into the actuators, to appear to be very low by both active and passive means. The ATM system actively creates low stiffness notches at the rotor induced vibration frequencies and passively creates similar low stiffness notches at the gear-clashing induced noise frequencies.

The present invention provides a novel actuator and system for reducing vibrational and noise transmission from a helicopter gearbox footing to the airframe. The ATM system was tested on the gearbox footing of a Sikorsky Aircraft Corporation S-76® aircraft. Reductions of about 13 dB in cabin noise and about 25 dB in vibrations have been achieved using the present invention. While the invention is illustrated and described as being used for reducing vibration and noise transmission from a gearbox foot 30 to an airframe, it is not limited to that embodiment. On the contrary, the present invention can be used to address vibration and noise transmissions from a variety of other components in various types of machines and aircraft. Although the invention has been described and illustrated with respect to the exemplary embodiments thereof, it should be understood by those skilled in the art that the foregoing and various other changes, omissions and additions may be made therein and thereto, without parting from the spirit and scope of the present invention. For example, a Hemholtz resonator could be used in place of the tuned stubs although this approach would address only the fundamental and not the tonal frequencies.

What is claimed is:

1. An active mount for use in a rotary wing aircraft, the aircraft including an airframe and a main rotor system having a transmission gearbox, the active mount comprising:

first and second rigid members for each of the locations where the gearbox is mounted to the airframe, the first rigid members adapted to be connected to the airframe at the mounting locations and the second rigid members adapted to be connected to the gearbox, first and second linear hydraulic actuators for each of the gearbox and airframe mounting locations, the hydraulic actuators having first and second ends, the first end of each actuator connected to the first rigid member, the actuators comprising:

a piston slidably disposed in a cylinder for linear reciprocal movement for varying the length of the actuator along a principal axis, and a piston rod having one end connected to the piston and the other end extending from the cylinder at the second end of the actuator and connected to the second rigid member, wherein the second rigid members are suspended from the first rigid members by the actuators and are movable relative to the first rigid members in response to reciprocal movement of the pistons along the principal axes and wherein the principal axes of the actuators are adapted to lie in the directional planes of the primary forces necessary for supporting the airframe and acting on the transmission gearbox mounting locations for providing movement of the gearbox relative to the airframe in the planes at a frequency for reducing the transfer of vibration through the active mount to the airframe.

2. A system for reducing vibration in a rotary wing aircraft, the rotary wing aircraft including an airframe, an engine mounted to the airframe and a main rotor system having a rotor and a transmission gearbox between the engine and the rotor for turning the engine force into the rotational force of the rotor, wherein the operation of the engine and the main rotor system generates vibration and noise that are transferable to the airframe causing vibration and noise on board the aircraft, the vibration reduction system comprising:

an active mount adapted to be disposed at each point of contact of the gearbox and airframe for mechanically suspending the airframe from the gearbox, the active mount comprising:

first and second rigid members for each of the contact points of the gearbox and the airframe, the first rigid members adapted to be connected to the airframe at the contact points and the second rigid members adapted to be connected to the gearbox, first and second linear hydraulic actuators for each of the contact points, the hydraulic actuators having first and second ends, the first end of each actuator connected to the first rigid member, the actuators comprising:

a piston slidably disposed in a cylinder for linear reciprocal movement for varying the length of the actuator along a principal axis, the piston and cylinder defining a fluid chamber, an a piston rod having one end connected to the piston and the other end extending from the cylinder at the second end of the actuator and connected to the second rigid member, wherein the second rigid members are suspended from the first rigid member and are movable relative to the first rigid members in response to reciprocal movement of the pistons along the principal axes and wherein the principal axes of the actuators are adapted to lie in he directional planes of the primary forces necessary for supporting the airframe and acting on the transmission gearbox mounting locations, means adapted for sensing parameters related to vibration of the airframe, the sensing means producing a signal output representative of the sensed parameter, hydraulic actuation means for supplying pressurized hydraulic fluid to the actuators, the hydraulic actuation means including a source of pressurized hydraulic fluid and an electro-hydraulic valve hydraulically connected between the source and the hydraulic actuators, wherein the length of the actuators is varied by selectively supplying a flow of pressurized hydraulic fluid from the source to the fluid chamber of the actuators and relieving the pressurized hydraulic fluid from the fluid chamber of the actuators to move the pistons in the cylinders alone the principal axes, and means operatively connected to the valve and the sensing means for receiving the signals produced by the sensing means and generating output control signals to the valve responsive to the sensing means signals for selectively supplying a flow of pressurized hydraulic fluid from the source to the actuators for varying the length of the actuators in the planes of the primary supporting forces and moving the gearbox in the planes relative to the airframe at a frequency for reducing the transfer of vibration through the active mount to the airframe.

3. The vibration reduction system as recited in claim 2, wherein the principal axis of the first actuator is substantially vertical.

4. The vibration reduction system as recited in claim 2, wherein the principal axis of the second actuator is substantially horizontal.

5. The vibration reduction system as recited in claim 2, wherein the sensing means comprises a position transducer for sensing position of the gearbox relative to the airframe and generating a signal output whose magnitude is a function of the position.

6. The vibration reduction system as recited in claim 2, wherein the sensing means comprises a pressure transducer for sensing hydraulic fluid pressure and generating a signal output whose magnitude is a function of the pressure.

7. The vibration reduction system as recited in claim 2, wherein the sensing means comprises an acceleration transducer for sensing acceleration and generating a signal output whose magnitude is a function of the acceleration.

8. The vibration reduction system as recited in claim 2 wherein the means for receiving the signals from the sensing means and generating output control signals to the valve includes a computer for applying a programmed control algorithm to the signals produced by the sensing means for generating the output control signals to the valves responsive to the sensing means signals.

9. The vibration reduction system as recited in claim 2, wherein one valve is provided for each actuator.

10. A system for reducing vibration in a rotary wing aircraft, the rotary wing aircraft including an airframe, an engine mounted to the airframe and a main rotor system having a rotor and a transmission gearbox between the engine and the rotor for turning the engine force into the rotational force of the rotor, wherein the operation of the engine and the main rotor system generates vibration and noise that are transferable to the airframe causing vibration and noise on board the aircraft, the vibration reduction system comprising:
- an active mount adapted be disposed between each point of contact of the gearbox and airframe for mechanically suspending the airframe from the gearbox, the active mount comprising:
  - first and second linear hydraulic actuators each having a principal axis, the length of the actuators variable along the principal axis for providing relative movement between the airframe and the gearbox, wherein the principal axes of the actuators are adapted to lie in the directional planes of the primary forces necessary for supporting the airframe and acting on the transmission gearbox mounting locations,
- means adapted for sensing parameters related to vibration from the airframe the sensing means producing a signal output representative of the sensed parameter,
- hydraulic actuation means for supplying pressurized hydraulic fluid to the actuators, the hydraulic actuation means including a source of pressurized hydraulic fluid and an electro-hydraulic valve hydraulically connected between the source and the hydraulic actuators, and
- means operatively connected to the valve and the sensing means for receiving the signals produced by the sensing means and generating output control signals to the valve responsive to the sensing means signals for selectively supplying a flow of pressurized hydraulic fluid from the source to the actuators for varying the length of the actuators in the planes of the primary supporting forces and moving the gearbox in the planes relative to the airframe at a frequency for reducing the transfer of vibration through the active mount to the airframe,
- wherein at least one valve controls the delivery of fluid to more than on actuator.

11. A system for reducing vibration in a rotary wing aircraft, the rotary wing aircraft including an airframe, an engine mounted to the airframe and a main rotor system having a rotor and a transmission gearbox between the engine and the rotor for turning the engine force into the rotational force of the rotor, wherein the operation of the engine and the main rotor system generates vibration and noise that are transferable to the airframe causing vibration and noise on board the aircraft, the vibration reduction system comprising:
- an active mount adapted be disposed between each point of contact of the gearbox and airframe for mechanically suspending the airframe from the gearbox, the active mount comprising:
  - first and second linear hydraulic actuators each having a principal axis, the length of the actuators variable along the principal axis for providing relative movement between the airframe and the gearbox, wherein the principal axes of the actuators are adapted to lie in the directional planes of the primary forces necessary for supporting the airframe and acting on the transmission gearbox mounting locations,
- an elastomeric bearing assembly connected in series with the actuator between the gearbox and the airframe,
- means adapted for sensing parameters related to vibration from the airframe, the sensing means producing a signal output representative of the sensed parameter,
- hydraulic actuation means for supplying pressurized hydraulic fluid to the actuators, the hydraulic actuation means including a source of pressurized hydraulic fluid and an electro-hydraulic valve hydraulically connected between the source and the hydraulic actuators, and
- means operatively connected to the valve and the sensing means for receiving the signals produced by the sensing means and generating output control signals to the valve responsive to the sensing means signals for selectively supplying a flow of pressurized hydraulic fluid from the source to the actuators for varying the length of the actuators in the planes of the primary supporting forces and moving the gearbox in the planes relative to the airframe at a frequency for reducing the transfer of vibration through the active mount to the airframe.

12. A system for reducing vibration in a rotary wing aircraft, the rotary wing aircraft including an airframe, an engine mounted to the airframe and a main rotor system having a rotor and a transmission gearbox between the engine and the rotor for turning the engine force into the rotational force of the rotor, wherein the operation of the engine and the main rotor system generates vibration and noise that are transferable to the airframe causing vibration and noise on board the aircraft, the vibration reduction system comprising:
- an active mount adapted to be disposed between each point of contact of the gearbox and airframe for mechanically suspending the airframe from the gearbox, the active mount comprising:
  - first and second linear hydraulic actuators each having a principal axis, the length of the actuators variable along the principal axis for providing relative movement between the airframe and the gearbox, wherein the principal axes of the actuators are adapted to lie in the directional planes of the primary forces necessary for supporting the airframe and acting on the transmission gearbox mounting locations,
- means adapted for sensing parameters related to vibration from the airframe, the sensing means producing a signal output representative of the sensed parameter,
- hydraulic actuation means for supplying pressurized hydraulic fluid to the actuators, the hydraulic actuation means including a source of pressurized hydraulic fluid and an electro-hydraulic valve hydraulically connected between the source and the hydraulic actuators,
- means operatively connected to the valve and the sensing means for receiving the signals produced by the sensing means and generating output control signals to the valve responsive to the sensing means signals for selectively supplying a flow of pressurized hydraulic fluid from the source to the actuators for varying the length of the actuators in the planes of the primary supporting forces and moving the gearbox in the planes relative to the airframe at a frequency for reducing the transfer of vibration through the active mount to the airframe, and
- a passive noise isolator in fluid communication with the hydraulic actuation means.

13. A rotary wing aircraft, comprising:
- an airframe having vertical longitudinal and vertical lateral planes,
- an engine mounted to the airframe,
- a main rotor system, including
  - a rotor, and
  - a transmission gearbox supported on the airframe between the engine and the rotor at a plurality of mounting points for turning the engine force into the rotational force of the rotor, wherein the operation of the engine and rotor generates vibration and noise that are transferable to the airframe causing vibration and noise on board the aircraft, and an active vibration reduction system, the system comprising, an active mount adapted to be disposed between each mounting point of the gearbox and airframe for mechanically suspending the airframe from the gearbox, the active mount comprising:

first and second rigid members for each of the locations where the gearbox is mounted to the airframe, the first rigid members adapted to be connected to the airframe at the mounting locations and the second rigid members adapted to be connected to the gearbox, first and second hydraulic actuators, for each of the mounting locations, the hydraulic actuators having first and second ends, the first end of each actuator connected to the first rigid member, the actuators comprising:

a piston slidably disposed in a cylinder for linear reciprocal movement for varying the length of the actuator along a principal axis, the piston and cylinder defining a fluid chamber, and a piston rod having one end connected to the piston and the other end extending from the cylinder at the second end of the actuator and connected to the second rigid member, wherein the second rigid members are suspended from the first rigid members and are movable relative to the first rigid members in response to reciprocal movement of the pistons along the principal axes and wherein the principal axes of the actuators lie in the directional planes of the primary forces necessary for supporting the airframe acting on the transmission gearbox mounting locations, means for sensing parameters related to vibration from the airframe, the sensing means producing a signal output representative of the sensed parameter, hydraulic actuation means for supplying pressurized hydraulic fluid to the actuators, the hydraulic actuation means including a source of pressurized hydraulic fluid and an electro-hydraulic valve hydraulically connected between the source and the hydraulic actuators, wherein the length of the actuators is varied by selectively supplying a flow of pressurized hydraulic fluid from the source to the fluid chamber of the actuators and relieving the pressurized hydraulic fluid from the fluid chamber of the actuators to move the pistons in the cylinders along the principal axes, and means operatively connected to the valve and the sensing means for receiving the signals produced by the sensing means and generating output control signals to the valve responsive to the sensing means signals for selectively supplying a flow of pressurized hydraulic fluid from the source to the actuators for varying the length of the actuators in the planes of the primary supporting forces and moving the gearbox in the planes relative to the airframe at a frequency for reducing the transfer of vibration through the active mount to the airframe.

14. The rotary wing aircraft as recited in claim 13, wherein the principal axis of the first actuator is substantially vertical.

15. The rotary wing aircraft as recited in claim 13, wherein the principal axis of the second actuator is substantially horizontal.

16. The rotary wing aircraft as recited in claim 15, wherein the principal axis of the second actuator also forms an acute angle with the longitudinal axis of the airframe.

17. The rotary wing aircraft as recited in claim 13, wherein the principal axis of the first actuator forms an acute angle with the vertical longitudinal and vertical lateral planes of the airframe.

18. The rotary wing aircraft as recited in claim 13, wherein the principal axis of the second actuator forms an acute angle with the vertical longitudinal and horizontal longitudinal planes of the airframe.

19. A rotary wing aircraft as recited in claim 13, wherein the hydraulic actuation means provides a quasi-steady pressure to each actuator to support the applied quasi-steady flight and maneuvering loads and for maintaining the transmission gearbox in a steady, static position relative to the airframe at maneuvering frequencies.

20. A rotary wing aircraft as recited in claim 13, wherein the sensing means comprises a position transducer for sensing position of the gearbox relative to the airframe and generating a signal output whose magnitude is a function of the position.

21. A rotary wing aircraft as recited in claim 13, wherein the sensing means comprises a pressure transducer for sensing hydraulic fluid pressure and generating a signal output whose magnitude is a function of the pressure.

22. A rotary wing aircraft as recited in claim 13, wherein the sensing means comprises an acceleration transducer for sensing acceleration and generating a signal output whose magnitude is a function of the acceleration.

23. A rotary wing aircraft as recited in claim 13, wherein the sensing means is co-located with the active mounts.

24. A rotary wing aircraft as recited in claim 13, wherein the means for receiving the signals from the sensing means and generating output control signals to the valve includes a computer for applying a programmed control algorithm to the signals produced by the sensing means for generating the output control signals to the valves responsive to the sensing means signals.

25. A rotary wing aircraft as recited in claim 13, wherein the active mounts comprise four active mounts with two such mounts being forward active mounts located forward of the rotor axis of rotation and opposite lateral sides thereof and the two remaining mounts being aft active mounts located aft of the rotor axis of rotation and on opposite lateral sides thereof.

26. A rotary wing aircraft, comprising:

an airframe having vertical longitudinal and vertical lateral planes, an engine mounted to the airframe, a main rotor system, including a rotor, and a transmission gearbox supported on the airframe between the engine and the rotor at four mounting points for turning the engine force into the rotational force of the rotor, wherein the operation of the engine and rotor generates vibration and noise that are transferable to the airframe causing vibration and noise on board the aircraft, and an active vibration reduction system, the system comprising, an active mount adapted to be disposed between each mounting point of the gearbox and airframe for mechanically suspending the airframe from the gearbox, two such mounts being forward active mounts located forward of the rotor axis of rotation and on opposite lateral sides thereof and the two remaining mounts being aft active mounts located aft of the rotor axis of rotation and on opposite lateral sides thereof, each active mount comprising:
  first and second hydraulic actuators each having a principal axis, the length of the actuators variable along the principal axes for providing relative movement between the airframe and gearbox, wherein the principal axes of the actuators lie in the directional planes of the primary forces necessary for supporting the airframe acting on the transmission gearbox mounting locations,
means for sensing parameters related to vibration from the airframe, the sensing means producing a signal output representative of the sensed parameter,
hydraulic actuation means for supplying pressurized hydraulic fluid to the actuators, the hydraulic actuation means including a source of pressurized hydraulic fluid and an electro-hydraulic valve hydraulically connected between the source and the hydraulic actuators, wherein a first valve controls the delivery of fluid to the first forward active mount and a second valve controls the delivery of fluid to the second forward active mount, and
means operatively connected to the valve and the sensing means for receiving the signals produced by the sensing means and generating output control signals to the valve responsive to the sensing means signals for selectively supplying a flow of pressurized hydraulic fluid from the source to the actuators for varying the length of the actuators in the planes of the primary supporting forces and moving the gearbox in the planes relative to the airframe at a frequency for reducing the transfer of vibration through the active mount to the airframe.

27. A rotary wing aircraft, comprising:
an airframe having vertical longitudinal and vertical lateral planes,
an engine mounted to the airframe,
a main rotor system, including
  a rotor, and
  a transmission gearbox supported on the airframe between the engine and the rotor at a plurality of mounting points for turning the engine force into the rotational force of the rotor,
wherein the operation of engine and rotor generates vibration and noise that are transferable to the airframe causing vibration and noise on board the aircraft, and
an active vibration reduction system, the system comprising,
an active mount adapted to be disposed between each mounting point of the gearbox and airframe for mechanically suspending the airframe from the gearbox, the active mount comprising:
  first and second hydraulic actuators each having a principal axis, the length of the actuators variable along the principal axes for providing relative movement between the airframe and gearbox, wherein the principal axes of the actuators lie in the directional planes of the primary forces necessary for supporting the airframe acting on the transmission gearbox mounting locations,
an elastomeric bearing assembly connected in series with the actuator between the gearbox and the airframe,
means for sensing parameters related to vibration from the airframe, the sensing means producing a signal output representative of the sensed parameter,
hydraulic actuation means for supplying pressurized hydraulic fluid to the actuators, the hydraulic actuation means including a source of pressurized hydraulic fluid and an electro-hydraulic valve hydraulically connected between the source and the hydraulic actuators, and
means operatively connected to the valve and the sensing means for receiving the signals produced by the sensing means and generating output control signals to the valve responsive to the sensing means signals for selectively supplying a flow of pressurized hydraulic fluid from the source to the actuators for varying the length of the actuators in the planes of the primary supporting forces and moving the gearbox in the planes relative to the airframe at a frequency for reducing the transfer of vibration through the active mount to the airframe.

28. A rotary wing aircraft, comprising:
an airframe having vertical longitudinal and vertical lateral planes,
an engine mounted to the airframe,
a main rotor system, including
  a rotor, and
  a transmission gearbox supported on the airframe between the engine and the rotor at a plurality of mounting points for turning the engine force into the rotational force of the rotor,
wherein the operation of the engine and rotor generates vibration and noise that are transferable to the airframe causing vibration and noise on board the aircraft, and
an active vibration reduction system, the system comprising,
an active mount adapted to be disposed between each mounting point of the gearbox and airframe for mechanically suspending the airframe from the gearbox, the active mount comprising:
  first and second hydraulic actuators each having a principal axis, the length of the actuators variable along the principal axes for providing relative movement between the airframe and gearbox, wherein the principal axes of the actuators lie in the directional planes of the primary forces necessary for supporting the airframe acting on the transmission gearbox mounting locations,
means for sensing parameters related to vibration from the airframe, the sensing means producing a signal output representative of the sensed parameter,
hydraulic actuation means for supplying pressurized hydraulic fluid to the actuators, the hydraulic actuation means including a source of pressurized hydraulic fluid and an electro-hydraulic valve hydraulically connected between the source and the hydraulic actuators,
means operatively connected to the valve and the sensing means for receiving the signals produced by the sensing means and generating output control signals to the valve responsive to the sensing means signals for selectively supplying a flow of pressurized hydraulic fluid from the source to the actuators for varying the length of the actuators in the planes of the primary supporting forces and moving the gearbox in the planes relative to the airframe at a frequency for reducing the transfer of vibration through the active mount to the airframe,
a passive noise isolator for reducing high frequency noise generated by the clashing of the transmission gear teeth.

29. A method for reducing vibration in a rotary wing aircraft, the rotary wing aircraft including an airframe, an engine mounted to the airframe and a main rotor system having a rotor and a transmission gearbox between the engine and the rotor for turning the engine force into the rotational force of the rotor, wherein the operation of the engine and the main rotor system generates vibration and noise that are transferable to the airframe causing vibration and noise on board the aircraft, the vibration reduction method comprising the steps of:

- providing an active mount adapted to be disposed between each point of contact of the gearbox and airframe for mechanically suspending the airframe from the gearbox, the active mount comprising:
  - first and second linear hydraulic actuators each having a principal axis, the length of the actuators variable along the principal axis for providing relative movement between the airframe and the gearbox,
  - wherein the principal axes of the actuators are adapted to lie in the directional planes of the primary forces necessary for supporting the airframe and acting on the transmission gearbox mounting locations,
- sensing parameters relate to vibration or noise from the airframe,
- producing a signal output representative of the sensed parameter,
- providing hydraulic actuation means for supplying pressurized hydraulic fluid to the actuators, the hydraulic actuation means including a source of pressurized hydraulic fluid and an electro-hydraulic valve hydraulically connected between the source and the hydraulic actuators,
- processing the signals produced by the sensor,
- generating an output control signal to the valve responsive to the sensed signal for operating the valve to selectively supply a flow of pressurized hydraulic fluid from the source to the actuators,
- moving the gearbox in the planes relative to the airframe varying the length of the actuators in the planes of the primary supporting forces at a frequency for reducing the transfer of vibration through the active mount to the airframe,
- providing a passive noise isolator, and
  - reducing high frequency noise generated by the clashing of the transmission gear teeth using the passive noise isolator.

30. A vibration reduction method as recited in claim 29, wherein the principal axis of the first actuator is substantially vertical.

31. A vibration reduction method as recited in claim 29, wherein the principal axis of the second actuator is substantially horizontal.

* * * * *